United States Patent
Hatta et al.

(10) Patent No.: US 10,397,133 B2
(45) Date of Patent: Aug. 27, 2019

(54) STATION-SIDE APPARATUS IN OPTICAL TRANSMISSION SYSTEM AND OPTICAL TRANSMISSION SYSTEM

(71) Applicant: NIPPON TELEGRAPH AND TELEPHONE CORPORATION, Tokyo (JP)

(72) Inventors: Saki Hatta, Tokyo (JP); Tomoaki Kawamura, Tokyo (JP); Kenji Kawai, Tokyo (JP); Nobuyuki Tanaka, Tokyo (JP); Satoshi Shigematsu, Tokyo (JP); Namiko Ikeda, Tokyo (JP); Shoko Ohteru, Tokyo (JP); Junichi Kato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/745,413

(22) PCT Filed: Jul. 14, 2016

(86) PCT No.: PCT/JP2016/070811
§ 371 (c)(1),
(2) Date: Jan. 16, 2018

(87) PCT Pub. No.: WO2017/014140
PCT Pub. Date: Jan. 26, 2017

(65) Prior Publication Data
US 2018/0212897 A1 Jul. 26, 2018

(30) Foreign Application Priority Data
Jul. 17, 2015 (JP) .................................. 2015-142671

(51) Int. Cl.
*H04B 10/40* (2013.01)
*H04B 10/50* (2013.01)
(Continued)

(52) U.S. Cl.
CPC ............ *H04L 47/788* (2013.01); *H04L 12/44* (2013.01); *H04Q 11/0067* (2013.01);
(Continued)

(58) Field of Classification Search
None
See application file for complete search history.

(56) References Cited

U.S. PATENT DOCUMENTS

2002/0120758 A1  8/2002  Chang
2006/0171714 A1  8/2006  Dove
(Continued)

FOREIGN PATENT DOCUMENTS

JP  2012-004701 A  1/2012
JP  2013-115637 A  6/2013
(Continued)

OTHER PUBLICATIONS

International Search Report and Written Opinion received for PCT Patent Application No. PCT/JP2016/070811, dated Oct. 4, 2016, 16 pages (8 pages of English Translation and 8 pages of Original Document).
(Continued)

*Primary Examiner* — Darren E Wolf
(74) *Attorney, Agent, or Firm* — Womble Bond Dickinson (US) LLP

(57) ABSTRACT

An upstream allocation circuit (14) and a downstream allocation circuit (15) are provided in an OLT (1). For example, a superimposed frame obtained by bundling upstream frames (upstream control frames+upstream data frames) from all ONUS is input to the upstream allocation
(Continued)

circuit (14) via a frame reproduction circuit (12-1). The superimposed frame may be generated at the stage of optical signals or generated after converting optical signals into electrical signals. The upstream allocation circuit (14) allocates each of the upstream control frames bundled into the superimposed frame to a predetermined PON control circuit (13) based on information (PON port number or LLID) added to the frames. The downstream allocation circuit (15) allocates, to a preset frame reproduction circuit (12), each downstream control frames output from the PON control circuits (13).

13 Claims, 28 Drawing Sheets

(51) Int. Cl.
*H04B 10/60* (2013.01)
*H04L 12/44* (2006.01)
*H04Q 11/00* (2006.01)
*H04L 12/911* (2013.01)

(52) U.S. Cl.
CPC ............. *H04B 10/40* (2013.01); *H04B 10/50* (2013.01); *H04B 10/60* (2013.01); *H04Q 2011/0086* (2013.01)

(56) References Cited

U.S. PATENT DOCUMENTS

| | | | |
|---|---|---|---|
| 2009/0245790 A1* | 10/2009 | Mizutani | H04J 3/0682 398/43 |
| 2012/0030380 A1 | 2/2012 | Yanagimachi | |
| 2012/0128349 A1 | 5/2012 | Mitsunaga et al. | |
| 2013/0272177 A1* | 10/2013 | Wei | H04L 5/14 370/294 |

FOREIGN PATENT DOCUMENTS

| | | |
|---|---|---|
| JP | 2014-068213 A | 4/2014 |
| JP | 2015-056671 A | 3/2015 |

OTHER PUBLICATIONS

International Preliminary Report on Patentability received for PCT Patent Application No. PCT/JP2016/070811, dated Feb. 1, 2018, 14 pages (8 pages of English Translation and 6 pages of Original Document).
Cortina, "Cortina Systems(registrered) CS8124 Quad 10G EPON OLT SoC", Product Brief, Cortina Systems, Inc., 2012, 2 pages.
Supplementary European Search Report and Written Opinion received for EP Patent Application No. 16827700.2, dated Feb. 11, 2019, 7 pages.

* cited by examiner

STATION-SIDE APPARATUS IN OPTICAL TRANSMISSION SYSTEM AND OPTICAL TRANSMISSION SYSTEM

TECHNICAL FIELD

The present invention relates to a station-side apparatus (OLT: Optical Line Terminal) in an optical transmission system that transfers frames between a host apparatus and a plurality of subscriber-side apparatuses (ONUs: Optical Network Units) connected via an optical transmission channel (PON: Passive Optical Network) and the optical transmission system and, more particularly, to an OLT capable of efficiently communicating with a number of ONUs and an optical transmission system.

BACKGROUND ART

FIG. 27 shows an example of this kind of optical transmission system (PON system). In FIG. 27, reference numeral 401 denotes an OLT (station-side apparatus); 402, an optical splitter; 403, an ONU (subscriber-side apparatus); 404, an external network (host apparatus); 405, an optical fiber laid between each ONU 403 and the optical splitter 402; 406, an optical fiber laid between the optical splitter 402 and the OLT 401; and 407, an optical transmission channel (PON section) between the OLT 401 and the ONUs 403. The OLT 401 transfers frames between the external network 404 and the plurality (M) of ONUs 403 connected via the optical splitter 402.

In this PON system, upstream frames transmitted as optical signals from the plurality of ONUs 403 are bundled by the optical splitter 402 and then transferred to the OLT 401. The OLT 401 controls the transmission timings of the upstream frames transmitted from the plurality of ONUs 403 so the upstream frames transmitted from the ONUs 403 do not collide with each other on the optical fiber 406, and performs processing of transferring upstream frames from the ONUs 403 to the external network 404 and processing of transferring a downstream frame from the external network 404 to each ONU 403.

FIG. 28 shows an example of the OLT 401. The OLT 401 includes an optical transceiver 408, a frame reproduction circuit 409, and a PON control circuit 410. The optical transceiver 408 performs electro-optical conversion of a downstream frame to each ONU 403, and photoelectric conversion of an upstream frame from each ONU 403. The frame reproduction circuit 409 performs processing for reproducing a frame from an electrical signal, such as FEC (Forward Error Correction) and encryption. Note that the input/output portion of the optical transceiver 408 is called a PON port (communication port). The OLT 401 shown in FIG. 28 is an OLT with a 1-PON port arrangement.

FIG. 29 shows an example of the PON control circuit 410. The PON control circuit 410 includes a data frame processing circuit 411 and a control frame processing circuit 412. The data frame processing circuit 411 processes data frames between the ONUs 403 and the external network 404. The control frame processing circuit 412 processes control frames between the ONUs 403 and the OLT 401. The upstream frame from each of the ONUs 403 includes an upstream data frame and an upstream control frame, and the downstream frame from the external network 404 includes a downstream data frame.

The data frame processing circuit 411 performs buffering processing, bridge processing, and the like. The control frame processing circuit 412 generates a downstream control frame by performing processing for establishing/managing a link with each ONU 403 and DBA (Dynamic Bandwidth Allocation) processing for controlling the transmission timings of the upstream frames, and transmits the generated downstream control frame to each ONU 403. That is, while the data frame is transferred upstream and downstream, the control frame is turned back in the control frame processing circuit 412 and transmitted to each ONU 403.

In this PON system, to reduce the total cost of the PON system, there is proposed a system (multiport PON system) in which one OLT accommodates a plurality of PON ports (see, for example, non-patent literature 1). In the multiport PON system, it is possible to increase the number of accommodated ONUs for one OLT, thereby reducing the system cost for one ONU.

FIG. 30 shows an example of an OLT in a related multiport PON system. An OLT 401 in this multiport PON system has N (N is an integer of 2 or more) PON ports, and includes N optical transceivers 408 (408-1 to 408-N) equal in number to the PON ports, N frame reproduction circuits 409 (409-1 to 409-N), and N PON control circuits 410 (410-1 to 410-N).

The OLT 401 in this multiport PON system can accommodate M ONUs 403 for one PON port, and accommodate (N×M) ONUs 403 at most. A control frame processing circuit 412 in each PON control circuit 410 has resources (hardware resources, CPU processing capability) capable of performing link establishment/management processing and DEA processing in accordance with the number of the M ONUs 403 or the number of logical IDs (LLIDs) assigned as identifiers to the M ONUs 403. The maximum number (M) of accommodated ONUs for one PON port is determined based on the resources (processing capability) of the PON control circuit 410.

Note that in FIGS. 28 to 30, reference numeral 413 denotes an upstream data frame; 414, a downstream data frame; 415, an upstream control frame; and 416, a downstream control frame.

However, in an actual multiport PON system, the number of ONUs to be accommodated or the number of LLIDs for each PON port hardly reaches the limited value (M) of the number. Thus, there are unused resources, thereby deteriorating the use efficiency of the PON control circuit. Also, it is wasteful in terms of electric power to use the PON control circuit with low use efficiency.

RELATED ART LITERATURE

Non-Patent Literature

Non-Patent Literature 1: "CS8124 Quad 10G EPON OLT", [online], [Searched Jul. 4, 2016], Internet <URL: http://www.cortina-access.com/pon-fttx/item/1001-cs8124>

Disclosure of Invention

Problem to be Solved by the Invention

The present invention has been made to solve the above-described problems, and has as its object to provide a station-side apparatus in an optical transmission system capable of eliminating the waste of power by increasing the use efficiency of a PON control circuit and intentionally making a PON control circuit unnecessary to be used, and the optical transmission system.

Means of Solution to the Problem

In order to achieve the above object of the present invention, there is provided a station-side apparatus in an optical transmission system, comprising a plurality of optical transceivers each configured to convert, into electrical signals, upstream frames including upstream control frames sent as optical signals from a plurality of subscriber-side apparatuses connected via an optical transmission channel, a plurality of frame reproduction circuits each configured to reproduce the upstream frames converted into the electrical signals by the plurality of optical transceivers, a plurality of control frame processing circuits each configured to perform predetermined processes for the upstream control frames included in the upstream frames reproduced by the plurality of frame reproduction circuits, an upstream allocation circuit configured to allocate each of the upstream control frames included in the upstream frames from the plurality of subscriber-side apparatuses to a predetermined one of the plurality of control frame processing circuits based on information added to the frames, and a downstream allocation circuit configured to allocate, to a predetermined one of the plurality of frame reproduction circuits, each of downstream control frames output from the control frame processing circuits to which the upstream control frames have been allocated.

Effect of the Invention

According to the present invention, a station-side apparatus is provided with an upstream allocation circuit for allocation each of upstream control frames included in upstream frames from a plurality of subscriber-side apparatuses to a predetermined control frame processing circuit based on information added to the frames, and a downstream allocation circuit for allocation, to a predetermined frame reproduction circuit, each of downstream control frames output from the control frame processing circuits to which the upstream control frames have been allocated. Thus, an upstream control frame is allocated to a PON control circuit with enough processing capability to improve the use efficiency of the PON control circuit and obtain a PON control circuit unnecessary to be used, thereby making it possible to eliminate the waste of power.

BEST MODE FOR CARRYING OUT THE INVENTION

Embodiments of the present invention will be described in detail below with reference to the accompanying drawings. Four embodiments (the first, second, third, and fourth embodiments) will be exemplified below to explain a station-side apparatus (OLT) in an optical transmission system according to the present invention. Note that the first and second embodiments have the same basic arrangement.

Figure 1:
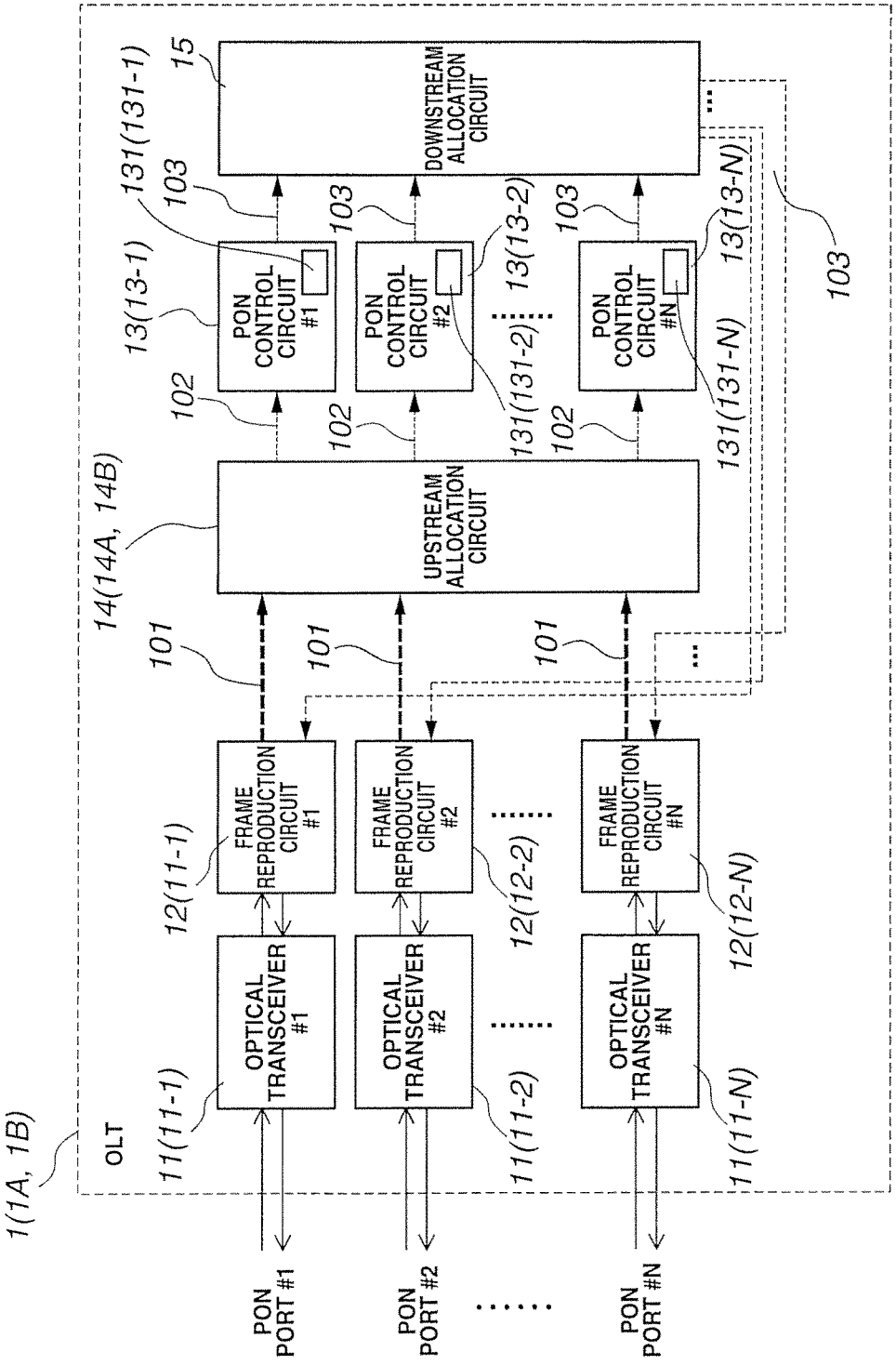
FIG. 1 is a block diagram showing the basic arrangement of a station-side apparatus (OLT) in an optical transmission system according to the first and second embodiments of the present invention.

FIG. 1 shows the basic arrangement of an OLT according to the first and second embodiments. An OLT 1 according to the first and second embodiments has N (N is an integer of 2 or more) PON ports, and includes N optical transceivers 11 (11-1 to 11-N) equal in number to the PON ports, N frame reproduction circuits 12 (12-1 to 12-N), N PON control circuits 13 (13-1 to 13-N), an upstream allocation circuit 14, and a downstream allocation circuit 15.

Figure 2:
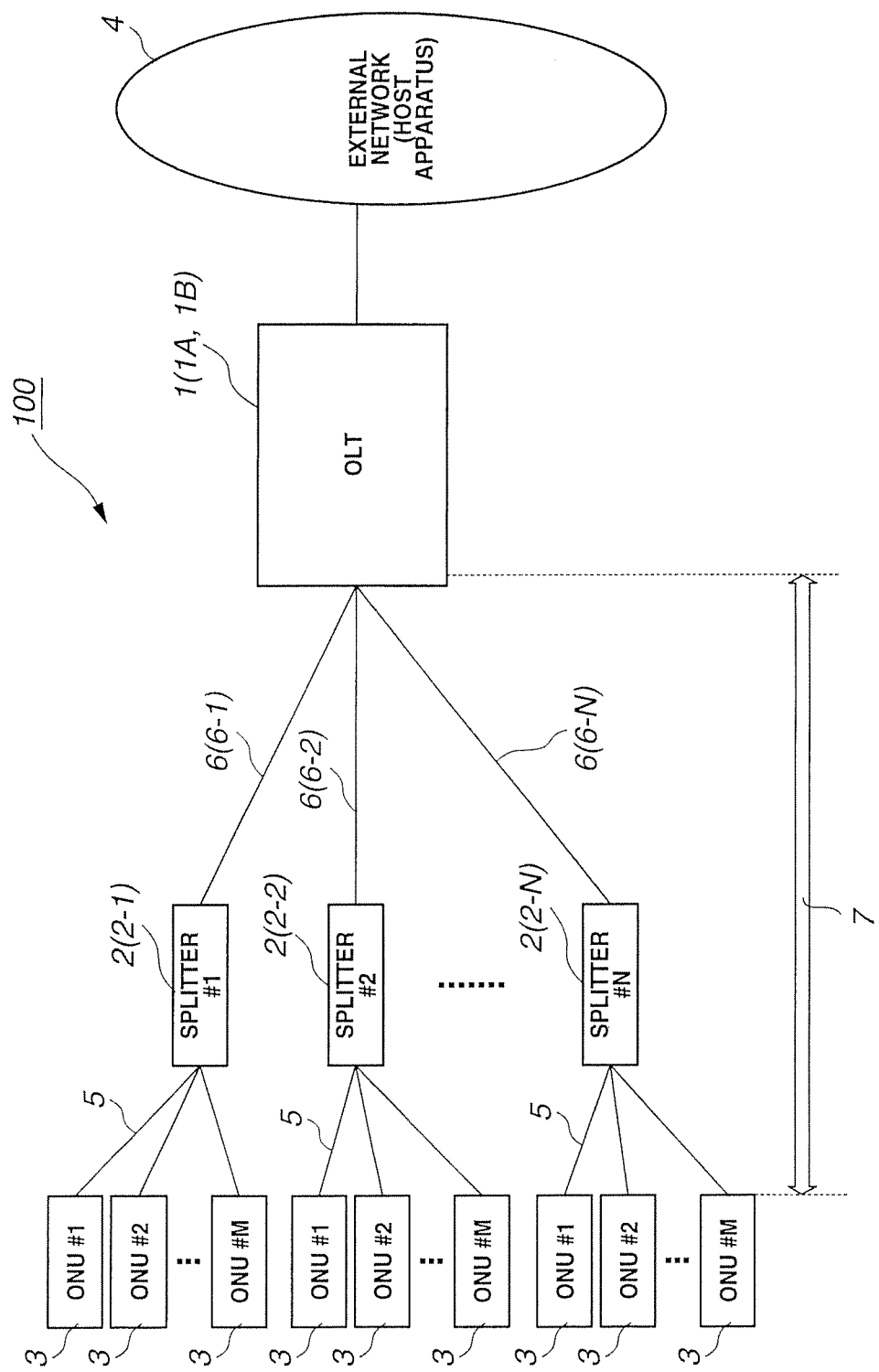
FIG. 2 is a block diagram showing an example of the optical transmission system (multiport PON system) using the OLT according to the first and second embodiments.

Note that in an optical transmission system 100 using the OLT 1, as shown in FIG. 2, a plurality of ONUs 3 are connected to the OLT 1 via a plurality of optical splitters 2 (2-1 to 2-N), optical fibers 5 are laid between the plurality of ONUs 3 and the plurality of optical splitters 2 (2-1 to 2-N), and optical fibers 6 are laid between the plurality of optical splitters 2 (2-1 to 2-N) and the OLT 1. Reference numeral 7 denotes an optical transmission channel (PON section) between the OLT 1 and the ONUs 3. The OLT 1 transfers frames between an external network (host apparatus) 4 and the plurality of ONUs 3 connected via the plurality of the optical splitters 2.

In the OLT 1, each optical transceiver 11 performs electro-optical conversion of a downstream frame to each ONU 3, and photoelectric conversion of an upstream frame from each ONU 3. Each frame reproduction circuit 12 performs processing for reproducing a frame from an electrical signal, such as FEC (Forward Error Correction) and encryption. Each PON control circuit 13 processes data frames between the ONUs 3 and the external network 4 and processes control frames between the ONUs 3 and the OLT 1. An upstream frame from each ONU 3 includes an upstream data frame and an upstream control frame, and a downstream frame from the external network 4 includes a downstream data frame.

Note that FIG. 1 shows only components related to control frame processing, and shows no components related to data frame processing. That is, only components that process control frames between the ONUs 3 and the OLT 1. Thus, as processing circuits in the PON control circuits 13 (13-1 to 13-N), only control frame processing circuits 131 (131-1 to 131-N) that process control frames between the ONUs 3 and the OLT 1 are shown.

Figure 30:
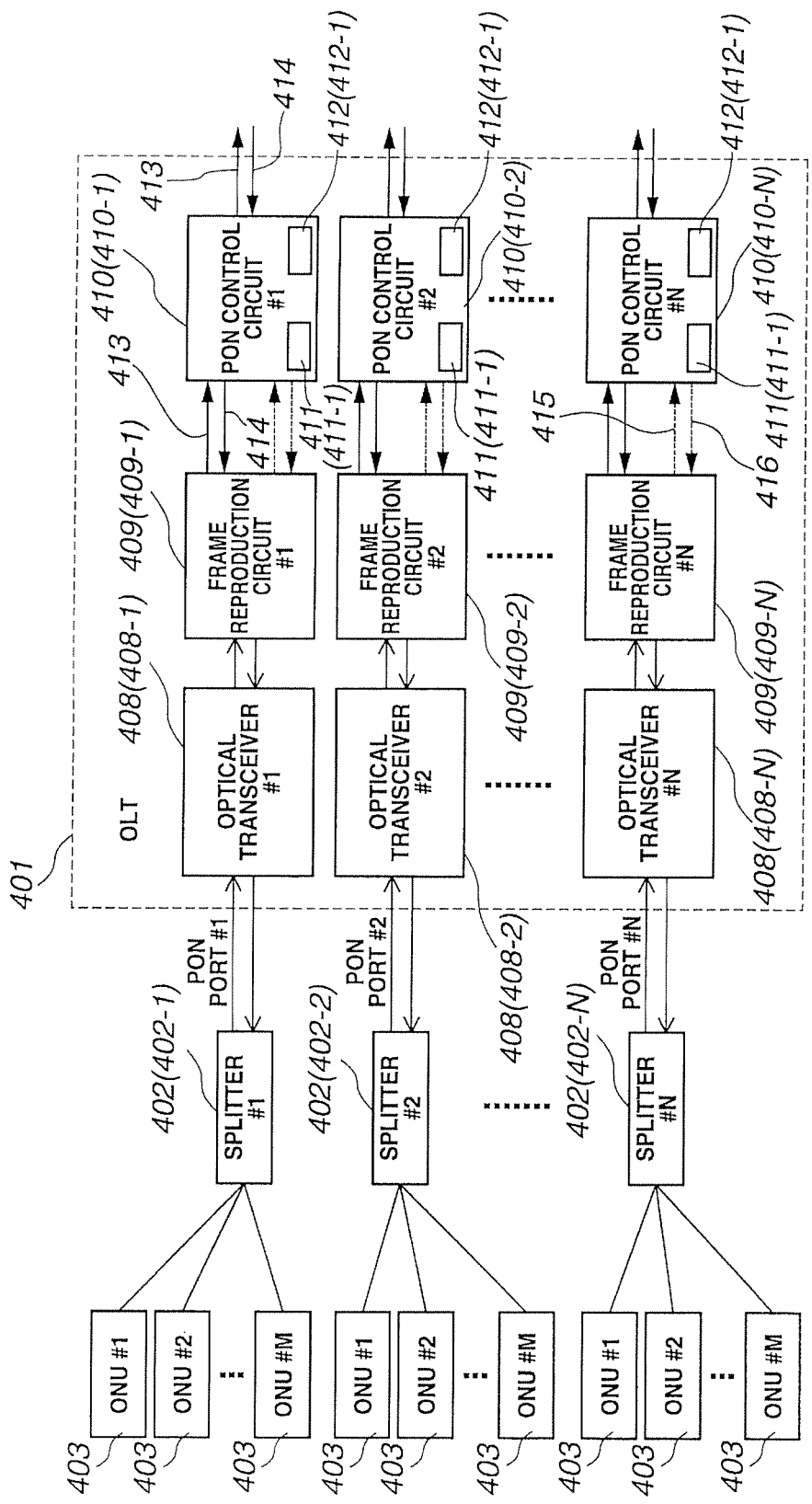
FIG. 30 is a block diagram showing an example of an OLT in a related multiport PON system.

When compared to the example shown in FIG. 30, the OLT 1 has a feature that the upstream allocation circuit 14 and the downstream allocation circuit 15 are provided. The difference between the OLTs 1 of the first and second embodiments is the arrangement of the upstream allocation circuit 14. The OLT 1 according to the first embodiment will be referred to as an OLT 1A hereinafter, and the OLT 1 according to the second embodiment will be referred to as an OLT 1B hereinafter. In addition, the upstream allocation circuit 14 in the OLT 1A according to the first embodiment will be referred to as an upstream allocation circuit 14A hereinafter, and the upstream allocation circuit 14 in the OLT 1B according to the second embodiment will be referred to as an upstream allocation circuit 14B hereinafter.

First Embodiment

In the OLT 1A according to the first embodiment, the upstream allocation circuit 14A receives a superimposed frame 101 obtained by bundling upstream frames (upstream control frames+upstream data frames) from all the ONUS 3 input via one of the frame reproduction circuits 12-1 to 12-N, and allocates each upstream control frame 102 bundled into the superimposed frame 101 to the predetermined PON control circuit 13 based on a PON port number added to the frame.

The PON port number has a value of 1 to N predetermined for each ONU, and can be generated by replacing the individual identification number or the like of the ONU in the frame. The downstream allocation circuit 15 allocates, to the preset predetermined frame reproduction circuit 12, a downstream control frame 103 output from the PON control circuit 13 to which the upstream control frame 102 has been allocated.

Figure 3:
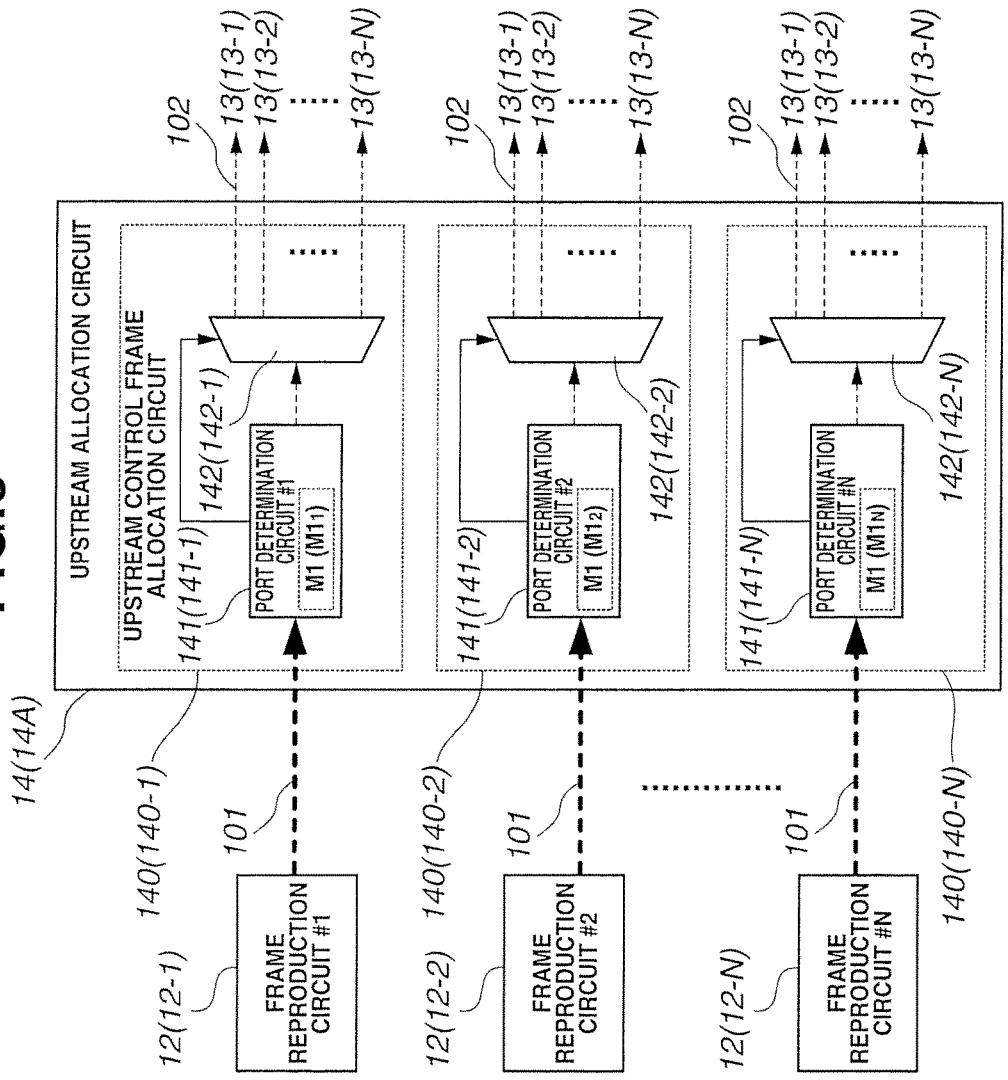
FIG. 3 is a circuit diagram showing an example of an upstream allocation circuit in the OLT according to the first embodiment.

FIG. 3 shows an example of the upstream allocation circuit 14A. The upstream allocation circuit 14A includes N upstream control frame allocation circuits 140 (140-1 to 140-N) equal in number to the PON ports. Each upstream control frame allocation circuit 140 (140-1 to 140-N) includes a port determination circuit 141 (141-1 to 141-N) and an output destination switching circuit 142 (142-1 to 142-N). The port determination circuits 141-1 to 141-N are provided in correspondence with the output destination switching circuits 142-1 to 142-N.

Upon receiving the superimposed frame 101 via each frame reproduction circuit 12 (12-1 to 12-N), the corresponding port determination circuit 141 (141-1 to 141-N) extracts a PON port number region stored in the preamble region or the like of each upstream control frame 102 bundled into the superimposed frame 101, determines a PON port number written in the PON port number region, and designates, for the corresponding output destination switching circuit 142 (142-1 to 142-N), a PON control circuit number corresponding to the determined PON port number as the allocation destination of the upstream control frame 102.

Figure 24:
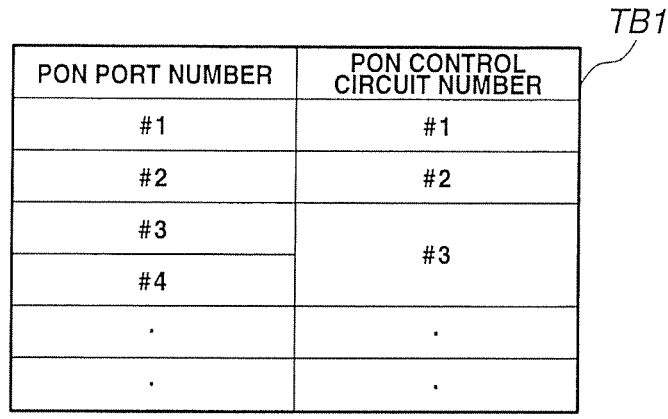
FIG. 24 is a table exemplifying a table indicating the relationship between a PON port number and the PON control circuit number of an allocation destination.

Each port determination circuit 141 (141-1 to 141-N) includes a memory M1 (M1$_1$ to M1$_N$), and the PON control circuit number of the allocation destination corresponding to the determined PON port number is written in the memory M1 (M1$_1$ to M1$_N$). For example, as shown in an example of FIG. 24, a table TB1 indicating the relationship between the PON port number and the PON control circuit number of the allocation destination is stored.

Each output destination switching circuit 142 (142-1 to 142-N) receives the designation of the allocation destination from the corresponding port determination circuit 141 (141-1 to 141-N), and outputs, to the designated PON control circuit 13, the upstream control frame 102 having undergone the port determination processing and sent from the corresponding port determination circuit 141 (141-1 to 141-N). This arrangement can output the upstream control frames 102 added with the same PON port number to the same PON control circuit 13.

Figure 4:
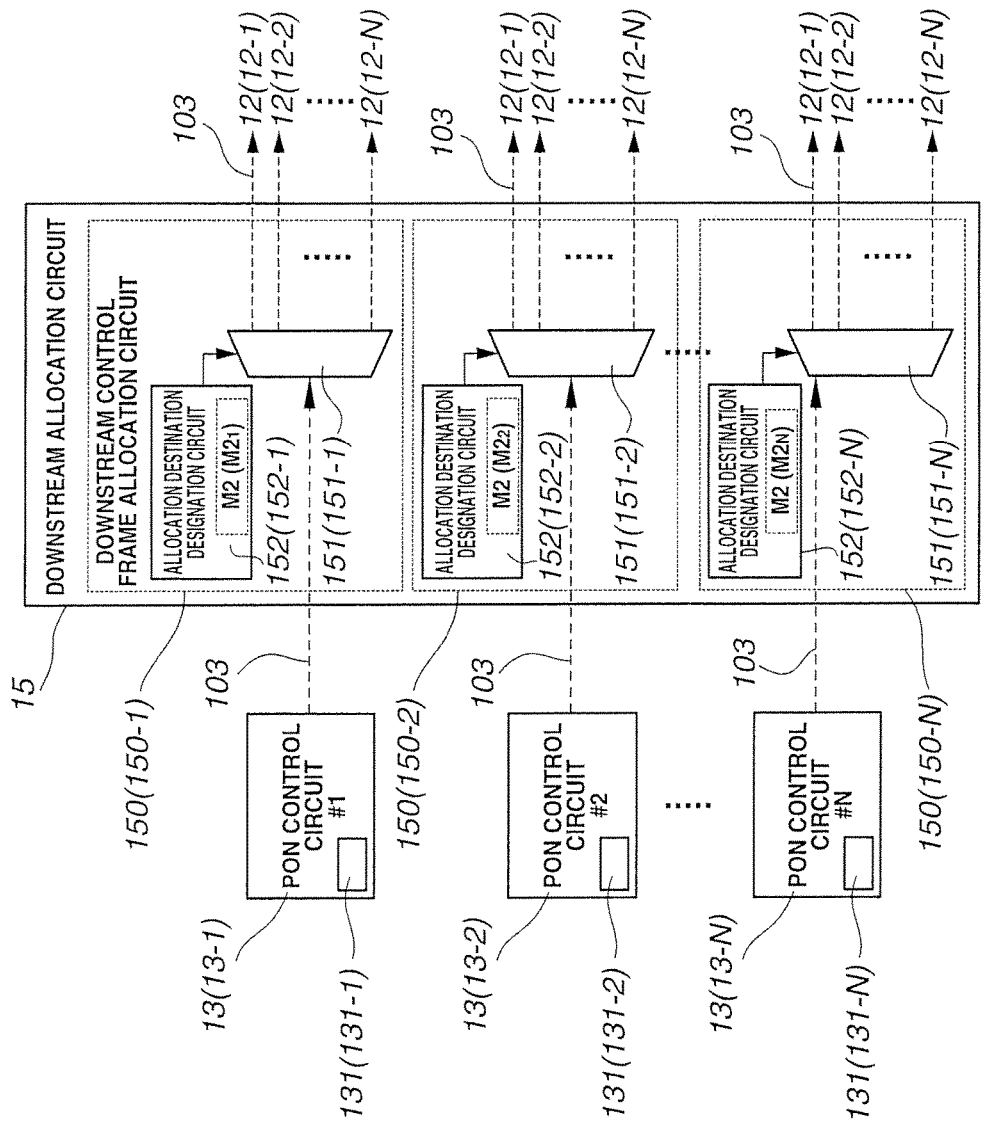
FIG. 4 is a circuit diagram showing an example of a downstream allocation circuit in the OLT according to the first and second embodiments.

FIG. 4 shows an example of the downstream allocation circuit 15. The downstream allocation circuit 15 includes N downstream control frame allocation circuits 150 (150-1 to 15-N) equal in number to the PON ports. Each downstream control frame allocation circuit 150 (150-1 to 150-N) includes an output destination switching circuit 151 (151-1 to 151-N) and an allocation destination designation circuit 152 (152-1 to 152-N). The allocation destination designation circuits 152-1 to 152-N are provided in correspondence with the output destination switching circuits 151-1 to 151-N.

Figure 25:
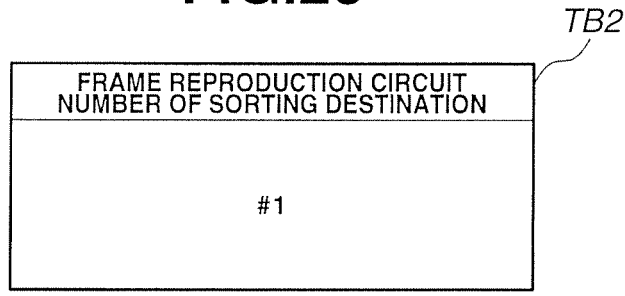
FIG. 25 is a table exemplifying a table in which the frame reproduction circuit number of the allocation destination is written.

Each output destination switching circuit 151 (151-1 to 151-N) outputs the downstream control frame 103 from the corresponding PON control circuit 13 (13-1 to 13-N) to the preset frame reproduction circuit 12 designated by the corresponding allocation destination designation circuit 152 (152-1 to 152-N). Each allocation destination designation circuit 152 (152-1 to 152-N) includes a memory M2 (M2$_1$ to M2$_N$), and the frame reproduction circuit number of the allocation destination is written in the memory M2 (M2$_1$ to M2$_N$). For example, as shown in FIG. 25, a table TB2 in which the frame reproduction circuit number of the allocation destination is written is stored. This arrangement can output, to the same frame reproduction circuit 12, all the downstream control frames 103 from the same PON control circuit 13.

Figure 5:
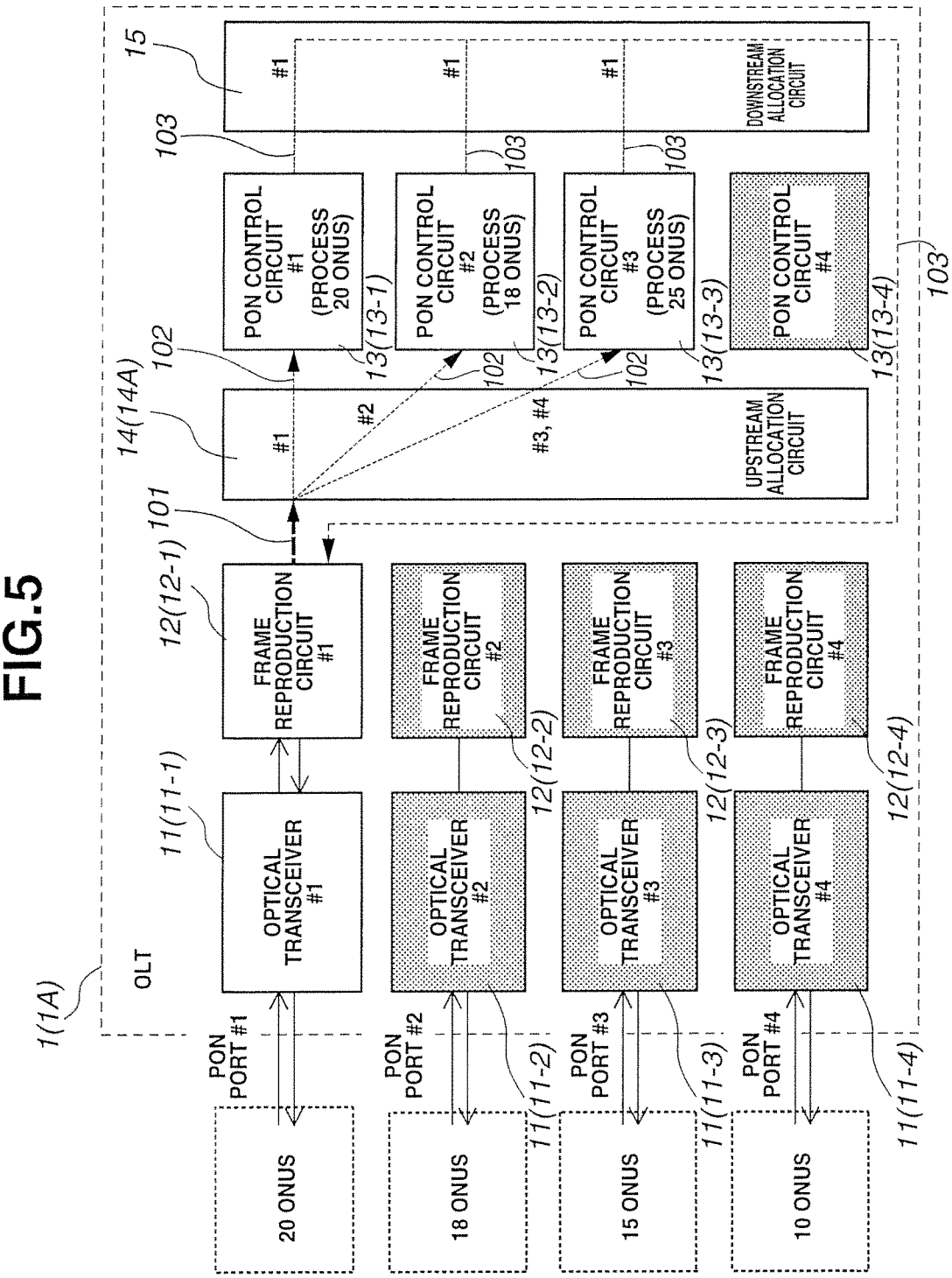
FIG. 5 is a block diagram for explaining an example of the operation of the OLT according to the first embodiment.

An example of the operation of the OLT 1A according to the first embodiment will be described next with reference to FIG. 5. As a practical example, assume a 4-PON port OLT in which the maximum number of accommodated ONUs for one PON port is 32. That is, one PON control circuit 13 has processing capability corresponding to the 32 ONUs 3 and the OLT 1A can accommodate the 128 ONUs 3 at most. PON ports #1 to #4 of the OLT 1A are connected to 20 ONUs 3, 18 ONUs 3, 15 ONUs 3, and 10 ONUs 3, respectively. Assume also that a system operation is performed by assigning the ONUs to PON port #1, and upstream frames from all the ONUs 3 are bundled into one superimposed frame 101 at the stage of optical signals, and input to the upstream allocation circuit 14A via the optical transceiver 11-1 and the frame reproduction circuit 12-1.

In the upstream allocation circuit 14A (see FIG. 3), upon receiving the superimposed frame 101 via the frame reproduction circuit 12-1 (frame reproduction circuit #1), the port determination circuit 141-1 determines a PON port number added to each upstream control frame 102 bundled into the superimposed frame 101, and designates, for the output destination switching circuit 142-1, a PON control circuit number corresponding to the determined PON port number as the allocation destination of the upstream control frame 102.

Assume that the PON control circuit number of the allocation destination corresponding to the PON port number is written in the memory M1 (M1$_1$) of the port determination circuit 141-1 so as to output the upstream control frame to the PON control circuit 13-1 (PON control circuit #1) if the upstream control frame is determined as the upstream control frame added with the number of PON port #1, to the PON control circuit 13-2 (PON control circuit #2) if the upstream control frame is determined as the upstream control frame added with the number of PON port #2, and to the PON control circuit 13-3 (PON control circuit #3) if the upstream control frame is determined as the upstream control frame added with the number of PON port #3 or that added with the number of PON port #4.

In this case, the port determination circuit 141-1 allocates, to the PON control circuit 13-1 (PON control circuit #1), the upstream control frames 102 from the 20 ONUs 3 connected to PON port #1, allocates, to the PON control circuit 13-2 (PON control circuit #2), the upstream control frames 102 from the 18 ONUs 3 connected to PON port #2, and allocates, to the PON control circuit 13-3 (PON control circuit #3), the upstream control frames 102 from the 15 ONUs 3 connected to PON port #3 and the 10 ONUs 3 connected to PON port #4.

With this processing, the PON control circuit 13-1 (PON control circuit #1) processes the upstream control frames 102 corresponding to the 20 ONUs, the PON control circuit 13-2 (PON control circuit #2) processes the upstream control frames 102 corresponding to the 18 ONUs, and the PON control circuit 13-3 (PON control circuit #3) processes the upstream control frames 102 corresponding to the 25 (=15+10) ONUs. The PON control circuits 13-1 to 13-3 output the processed downstream control frames 103 to the downstream allocation circuit 15.

In the downstream allocation circuit 15 (see FIG. 4), the downstream control frames 103 from the PON control circuits 13-1 to 13-3 are input to the output destination switching circuits 151-1 to 151-3, respectively. The output destination switching circuits 151-1 to 151-3 allocate the downstream control frames 103 from the PON control circuits 13-1 to 13-3 to the preset frame reproduction circuits 12 designated by the allocation destination designation circuits 152-1 to 152-3, respectively.

In this example, the frame reproduction circuit 12-1 serving as the output source of the superimposed frame 101 is set as the frame reproduction circuit 12 of the allocation destination in the memories M2 (M2$_1$ to M2$_N$) of all the allocation destination designation circuits 152 (152-1 to 152-N). This outputs, to the frame reproduction circuit 12-1 (frame reproduction circuit #1), all the downstream control frames 103 input to the downstream allocation circuit 15.

In the OLT 1A, although the number of accommodated ONUs for one PON port is 32 and the maximum number of accommodated ONUs of the whole OLT is 128, the 63 ONUs are accommodated in total. However, in this operation example, the operation by assigning the ONUs to PON port #1 using the superimposed frame 101 virtually increases the number of accommodated ONUs for one PON port to 63. This can power off unused circuits in advance.

That is, as in this operation example, if the superimposed frame 101 is generated at the stage of optical signals, circuits used in the OLT 1A are the optical transceiver 11-1, the frame reproduction circuit 12-1, the PON control circuits 13-1 to 13-3, the upstream allocation circuit 14A, and the downstream allocation circuit 15. The remaining circuits (the optical transceivers 11-2 to 11-4, the frame reproduction circuits 12-2 to 12-4, and the PON control circuit 13-4) can be powered off.

Furthermore, the use efficiency of the PON control circuit 13-3 is improved by allocation, to the PON control circuit 13-3, the upstream control frames 102 from the 15 ONUs 3 connected to PON port #3 and the 10 ONUs 3 connected to PON port #4 to process them. Along with the improvement of the use efficiency of the PON control circuit 13-3, there exists the PON control circuit 13-4 as a PON control circuit unnecessary to be used. By powering off the PON control circuit 13-4 in advance, it is possible to eliminate the waste of power.

Note that in this example, the superimposed frame 101 is generated at the stage of optical signals. However, the superimposed frame 101 may be generated after converting optical signals into electrical signals. For example, if each of the optical transceivers 11-1 to 11-4 converts optical signals into electrical signals to generate the superimposed frame 101, the optical transceivers 11-2 to 11-4 are added as the circuits used in the OLT 1A. In this case, the frame reproduction circuits 12-2 to 12-4 and the PON control circuit 13-4 can be powered off as the remaining circuits. In either case, when compared to the example shown in FIG. 30, the circuits which can be powered off in the OLT can be increased, thereby reducing the power consumption of the OLT.

Furthermore, if the operation is performed by assigning the ONUs to one PON port using the superimposed frame 101 generated at the stage of optical signals, it is unnecessary to lay optical fibers for the PON ports to which no ONUs are assigned. Thus, it is also possible to suppress the facility cost by eliminating unnecessary optical fibers.

Note that in this example, the frame reproduction circuit 12 of the allocation destination is preset in the allocation destination designation circuits 152 (152-1 to 152-N) of the downstream allocation circuit 15. The present invention, however, is not limited to this. For example, similarly to the upstream allocation circuit 14A, an arrangement in which a port determination circuit is provided so as to designate the frame reproduction circuit 12 of the allocation destination based on a PON port number added to each downstream control frame 103 may be adopted. The same applies to the second embodiment (to be described later).

In the above-described operation example, the system form in which the operation is performed by assigning the ONUs to one PON port (PON port #1) has been explained. The present invention, however, is not limited to this. For example, the ONUs may be assigned to two PON ports. If the ONUs are assigned to two PON ports, two superimposed frames obtained by dividing and bundling the upstream frames from all the ONUs 3 into two groups are input to the upstream allocation circuit 14A via the two frame reproduction circuits 12, and each upstream control frame bundled into the two superimposed frames is allocated to the predetermined PON control circuit 13 based on a PON port number added to the upstream frame. A system designer can arbitrarily decide specific PON ports to which the ONUs are assigned and a specific PON port corresponding to the frame reproduction circuit 12 to which each superimposed frame is to be output. The same applies to the second embodiment.

The above operation example has been explained using the practical numerical values. The numerical values in the operation example are merely examples, and other values can be used, as a matter of course. The same applies to the second embodiment.

Second Embodiment

The OLT 1B according to the second embodiment will be described next. The OLT 1A according to the first embodiment has the arrangement in which the upstream control frames 102 are allocated based on the PON port numbers, and all the upstream control frames 102 added with the same PON port number are processed by the same PON control circuit 13. Therefore, if the number of upstream control frames 102 added with the same PON port number is close to the maximum number of processable frames in the PON control circuit 13, it is difficult for the same PON control circuit 13 to process the upstream control frames 102 with another PON port number, and the use efficiency of the PON control circuit 13 is decreased.

In the OLT 1B according to the second embodiment, the upstream allocation circuit 14B having an arrangement of determining the allocation destinations of upstream control frames 102 for each LLID is used as the upstream allocation circuit 14. The upstream control frames 102 added with the same PON port number can be processed by the different PON control circuits 13, thereby improving the use efficiency of each PON control circuit 13. As a result, the number of PON control circuits 13 which can be powered off increases, and it can thus be expected to further reduce the power consumption of the OLT. It is also possible to implement a flexible system arrangement.

Figure 6:
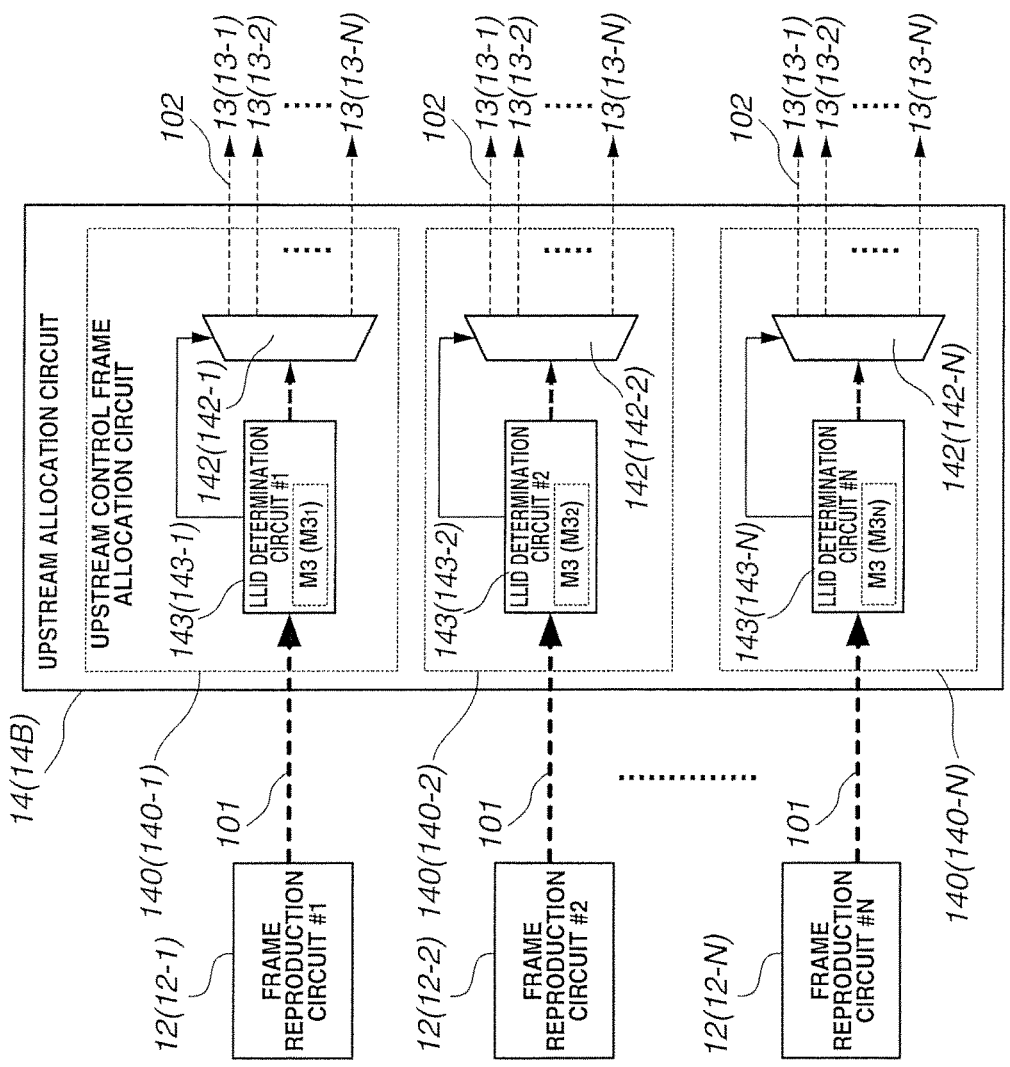
FIG. 6 is a circuit diagram showing an example of an upstream allocation circuit in the OLT according to the second embodiment.

In the OLT 1B according to the second embodiment, the arrangement of the downstream allocation circuit 15 is the same as that in the OLT 1A according to the first embodiment. The difference from the first embodiment is the arrangement of the upstream allocation circuit 14. FIG. 6 shows an example of the upstream allocation circuit 14B used in the OLT 1B according to the second embodiment. The difference from the upstream allocation circuit 14A (FIG. 3) used in the OLT 1A according to the first embodiment is that instead of the port determination circuits 141 (141-1 to 141-N), N LLID determination circuits 143 (143-1 to 143-N) equal in number to the PON ports are provided in the upstream control frame allocation circuits 140 (140-1 to 140-N), respectively.

Upon receiving a superimposed frame 101 via each frame reproduction circuit 12 (12-1 to 12-N), the corresponding LLID determination circuit 143 (143-1 to 143-N) extracts an LLID region stored in the preamble region or the like of each upstream control frame 102 bundled into the superimposed frame 101, determines an LLID written in the LLID region, and designates, for the corresponding output destination switching circuit 142 (142-1 to 142-N), a PON control circuit number corresponding to the determined LLID as the allocation destination of the upstream control frame 102.

Figure 26:
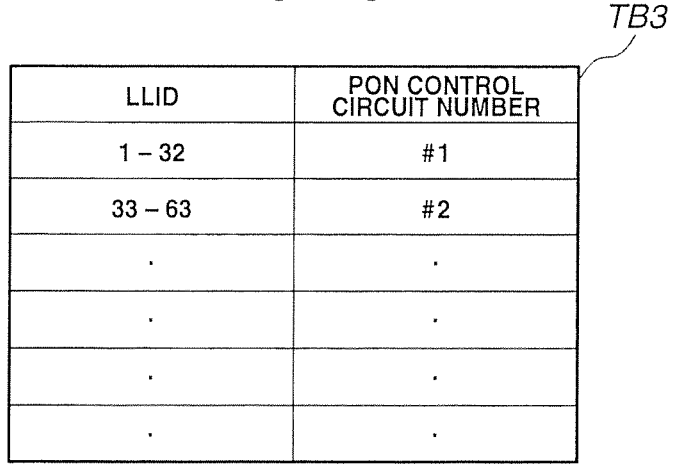
FIG. 26 is a table exemplifying a table indicating the relationship between an LLID and the PON control circuit number of the allocation destination.
Figure 27:
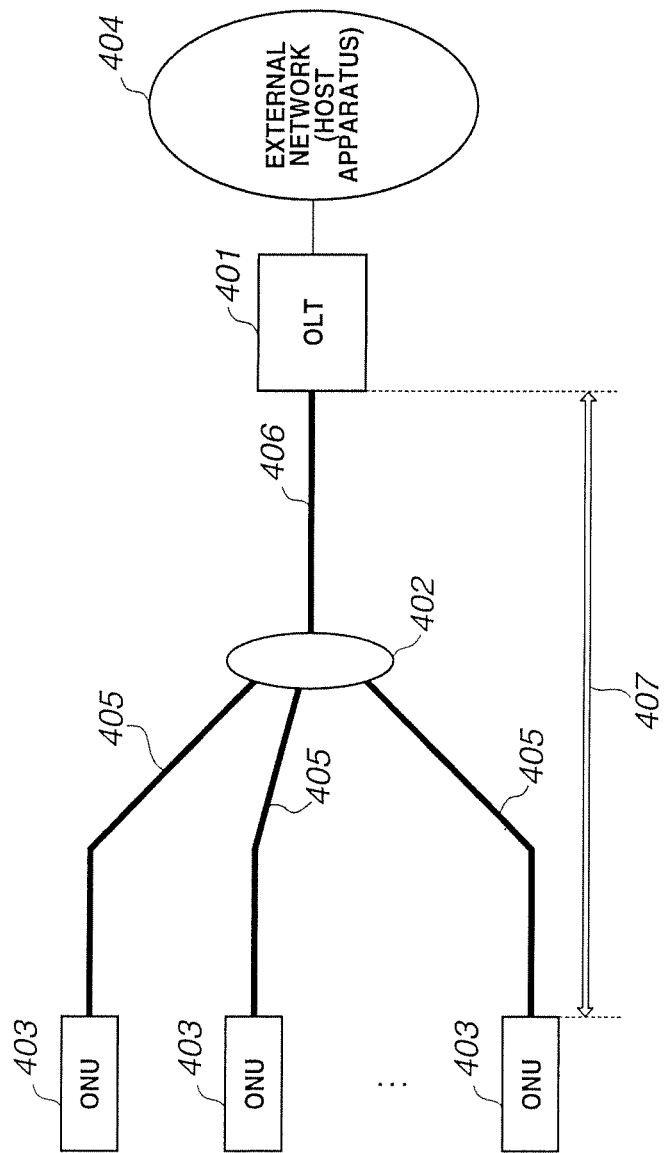
FIG. 27 is a view showing an example of an optical transmission system (1-port PON system)
Figure 28:
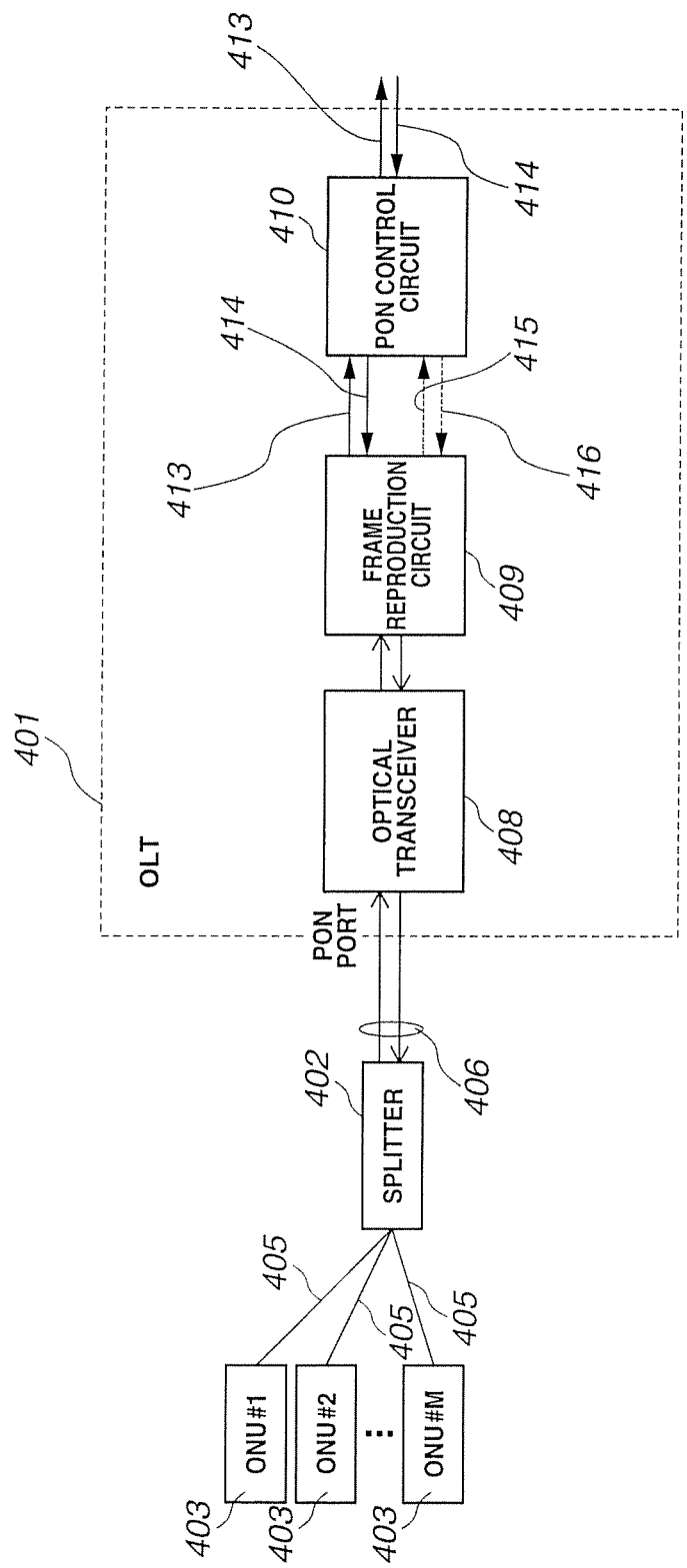
FIG. 28 is a block diagram showing an example of an OLT in the 1-port PON system.
Figure 29:
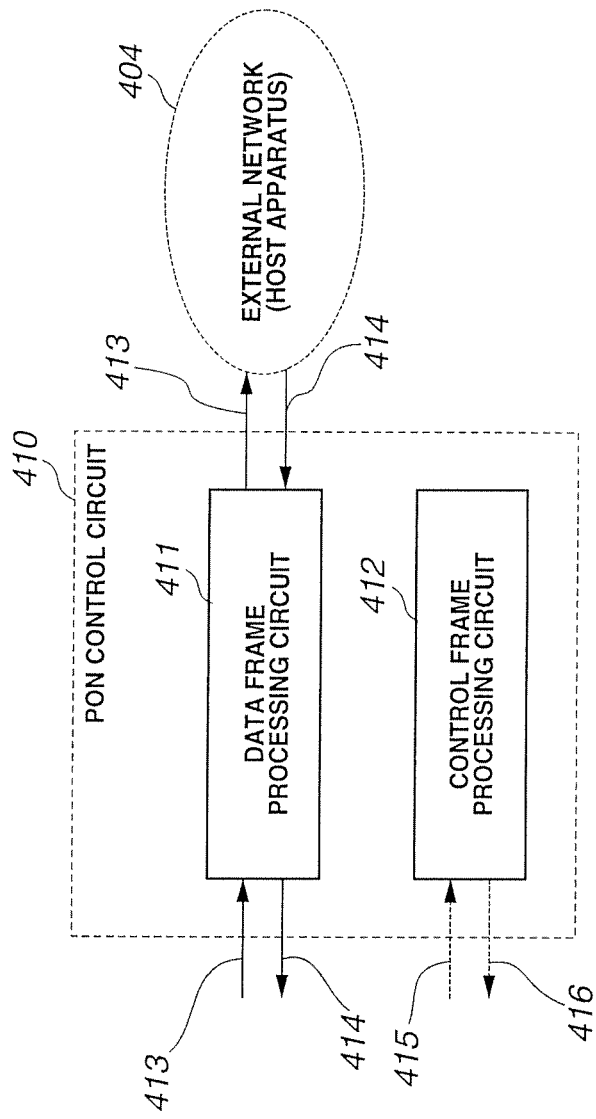
FIG. 29 is a block diagram showing an example of a PON control circuit.

Each LLID determination circuit 143 (143-1 to 143-N) includes a memory M3 ($M3_1$ to $M3_N$), and the PON control circuit number of the allocation destination corresponding to the determined LLID is written in the memory M3 ($M3_1$ to $M3_N$). For example, as shown in FIG. 26, a table TB3 indicating the relationship between the LLID and the PON control circuit number of the allocation destination is stored.

Each output destination switching circuit 142 (142-1 to 142-N) receives the destination of the allocation destination from the corresponding LLID determination circuit 143 (143-1 to 143-N), and outputs, to the designated PON control circuit 13, the upstream control frame 102 having undergone the LLID determination processing and sent from the corresponding LLID determination circuit 143 (143-1 to 143-N). This arrangement can allocate the arbitrary upstream control frame 102 to the arbitrary PON control circuit 13. That is, it is possible to allocate even the upstream control frames 102 added with the same PON port number to the different PON control circuits 13.

Figure 7:
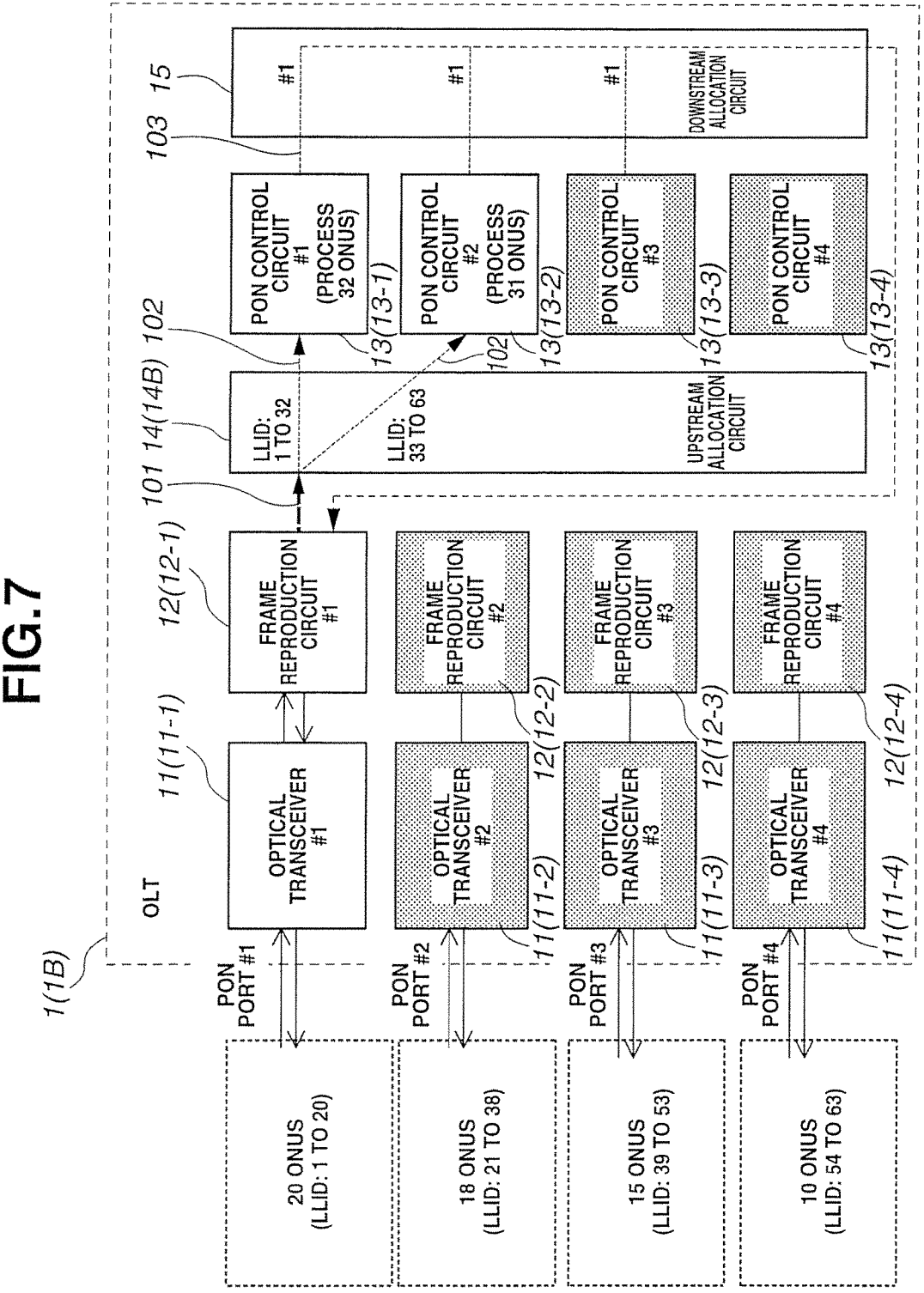
FIG. 7 is a block diagram for explaining an example of the operation of the OLT according to the second embodiment.

An example of the operation of the OLT 1B according to the second embodiment will be described next with reference to FIG. 7. Note that assumed conditions are the same as those for the operation example of the OLT 1A according to the first embodiment described with reference to FIG. 5. That is, each PON control circuit 13 has processing capability corresponding to the number of frames to be processed in the 32 ONUs 3, and the OLT 1B can accommodate the 128 ONUs 3 at most. Assume that PON ports #1 to #4 of the OLT 1B are connected to the 20 ONUs 3, 18 ONUs 3, 15 ONUs 3, and 10 ONUs 3, respectively. Assume also that a system operation is performed by assigning the ONUs to PON port #1, and upstream frames from all the ONUs 3 are bundled into the one superimposed frame 101 at the stage of optical signals, and input to the upstream allocation circuit 14B via the optical transceiver 11-1 and the frame reproduction circuit 12-1. Note that LLIDs=1 to 63 are assigned across the PON ports.

In the upstream allocation circuit 14B (see FIG. 6), upon receiving the superimposed frame 101 via the frame reproduction circuit 12-1 (frame reproduction circuit #1), the LLID determination circuit 143-1 determines an LLID added to each upstream control frame 102 bundled into the superimposed frame 101, and designates, for the output destination switching circuit 142-1, a PON control circuit number corresponding to the determined LLID as the allocation destination of the upstream control frame 102.

Assume that the PON control circuit number of the allocation destination corresponding to the LLID is written in the memory M3 ($M3_1$) of the LLID determination circuit 143-1 so as to output the upstream control frame to the PON control circuit 13-1 (PON control circuit #1) if the upstream control frame is determined as the upstream control frame added with an LLID of 1 to 32 (the ONUs 3 connected to the PON port #1 and some of the ONUs 3 connected to PON port #2), and to the PON control circuit 13-2 (PON control circuit #2) if the upstream control frame is determined as the upstream control frame added with an LLID of 33 to 63 (some of the ONUs 3 connected to PON port #2 and the ONUs 3 connected to the PON ports #3 and #4).

In this case, the LLID determination circuit 143-1 allocates, to the PON control circuit 13-1 (PON control circuit #1), the upstream control frames 102 from the 20 ONUs 3 connected to PON port #1 and the upstream control frames 102 from the 12 ONUs 3 connected to PON port #2, and allocates, to the PON control circuit 13-2 (PON control circuit #2), the upstream control frames 102 from the remaining six ONUs 3 connected to PON port #2, the upstream control frames 102 from the 15 ONUs 3 connected to PON port #3, and the upstream control frames 102 from the 10 ONUs 3 connected to PON port #4.

The PON control circuit 13-1 (PON control circuit #1) processes the upstream control frames 102 corresponding to the 32 LLIDs and the PON control circuit 13-2 (PON control circuit #2) processes the upstream control frames 102 corresponding to the 31 LLIDs. The PON control circuits 13-1 and 13-2 output the processed downstream control frames 103 to the downstream allocation circuit 15.

In the downstream allocation circuit 15 (see FIG. 4), the downstream control frames 103 from the PON control circuits 13-1 and 13-2 are input to the output destination switching circuits 151-1 and 151-2, respectively. The output destination switching circuits 151-1 and 151-2 allocate the downstream control frames 103 from the PON control circuits 13-1 and 13-2 to the preset frame reproduction circuits 12 designated by the allocation destination designation circuits 152-1 and 152-2, respectively.

In this example, the frame reproduction circuit 12-1 serving as the output source of the superimposed frame 101 is set as the frame reproduction circuit 12 of the allocation destination in the memories M2 ($M2_1$ to $M2_N$) of all the allocation destination designation circuits 152 (152-1 to 152-N). This outputs, to the frame reproduction circuit 12-1 (frame reproduction circuit #1), all the downstream control frames 103 input to the downstream allocation circuit 15.

In the OLT 1B as well, although the number of accommodated ONUs for one PON port is 32 and the maximum number of accommodated ONUs of the whole OLT is 128, the 63 ONUs are accommodated in total. However, in this operation example, the operation by assigning the ONUs to PON port #1 using the superimposed frame 101 virtually increases the number of accommodated ONUs for one PON port to 63. This can power off unused circuits in advance.

That is, as in this operation example, if the superimposed frame 101 is generated at the stage of optical signals, circuits used in the OLT 1B are the optical transceiver 11-1, the frame reproduction circuit 12-1, the PON control circuits 13-1 and 13-2, the upstream allocation circuit 14B, and the downstream allocation circuit 15. The remaining circuits (the optical transceivers 11-2 to 11-4, the frame reproduction circuits 12-2 to 12-4, and the PON control circuits 13-3 and 13-4) can be powered off.

Furthermore, the use efficiencies of the PON control circuits 13-1 and 13-2 are improved by allocation, to the PON control circuit 13-1, the upstream control frames 102 from the 20 ONUs 3 connected to PON port #1 and the 12 ONUs 3 connected to PON port #2 to process them, and allocation, to the PON control circuit 13-2, the upstream control frames 102 from the remaining six ONUs 3 connected to PON port #2, the 15 ONUs 3 connected to PON port #3, and the 10 ONUs 3 connected to PON port #4 to process them. Along with the improvement of the use efficiencies of the PON control circuits 13-1 and 13-2, there exist the PON control circuits 13-3 and 13-4 as PON control circuits unnecessary to be used. By powering off the PON control circuits 13-3 and 13-4 in advance, it is possible to eliminate the waste of power.

That is, in the operation example (FIG. 5) according to the first embodiment, only the PON control circuit 13-4 can be powered off. To the contrary, in the operation example (FIG. 7) according to the second embodiment, the improvement of the use efficiencies of the PON control circuits 13-1 and 13-2 can power off the PON control circuit 13-3 in addition to the PON control circuit 13-4, thereby further eliminating the waste of power, as compared with the OLT 1A according to the first embodiment.

Note that in this example, the superimposed frame 101 is generated at the stage of optical signals. However, as described in the first embodiment, the superimposed frame 101 may be generated after converting optical signals into electrical signals. For example, if each of the optical transceivers 11-1 to 11-4 converts optical signals into electrical signals to generate the superimposed frame 101, the optical transceivers 11-2 to 11-4 are added as the circuits used in the OLT 1B. In this case, the frame reproduction circuits 12-2 to 12-4 and the PON control circuits 13-3 and 13-4 can be powered off as the remaining circuits.

If the superimposed frame 101 is generated at the stage of optical signals, it is possible to virtually increase the number of accommodated ONUS/LLIDs for one PON port up to the maximum number processable by the optical transceiver 11. On the other hand, if the superimposed frame 101 is generated at the stage of electrical signals, it is possible to virtually increase the number of accommodated ONUs/LLIDs for one PON port up to the maximum number (N×M) (N: the number of PON control circuits, M: the number of ONUS or LLIDs for one PON port) determined in one OLT.

The operation by assigning the ONUs to one PON port using the superimposed frame 101 can flexibly build an optical transmission system regardless of the number of the accommodated ONUs of the existing PON port. As a result of assigning ONUs to one or a plurality of PON ports, some of the optical transceivers 11 and some of the frame reproduction circuits 12 are unnecessary to be used in addition to the PON control circuits 13. Therefore, it is possible to reduce the power consumption of the whole OLT by powering off those circuits in advance.

As described in the first embodiment, if the operation is performed by assigning the ONUs to one PON port using the superimposed frame 101 generated at the stage of optical signals, it is unnecessary to lay optical fibers for the PON ports to which no ONUs are assigned. Thus, it is also possible to suppress the facility cost by eliminating unnecessary optical fibers.

In this example, the LLID are assigned across the PON ports. The present invention, however, is not limited to this. For example, an LLID may be assigned for each PON port. In this case, in the upstream allocation circuit 14B, a port determination circuit is provided at the preceding stage of the LLID determination circuits 143 (143-1 to 143-N), and each upstream control frame 102 is allocated to an output destination corresponding to a PON port number and an LLID.

In this example, the frame reproduction circuit 12 of the allocation destination is preset in each of the allocation destination designation circuits 152 (152-1 to 152-N) of the downstream allocation circuit 15. The present invention, however, is not limited to this. For example, similarly to the upstream allocation circuit 14B, an arrangement in which an LLID determination circuit is provided so as to designate the frame reproduction circuit 12 of the allocation destination based on an LLID added to each downstream control frame 103 may be adopted.

Third Embodiment

Figure 8:
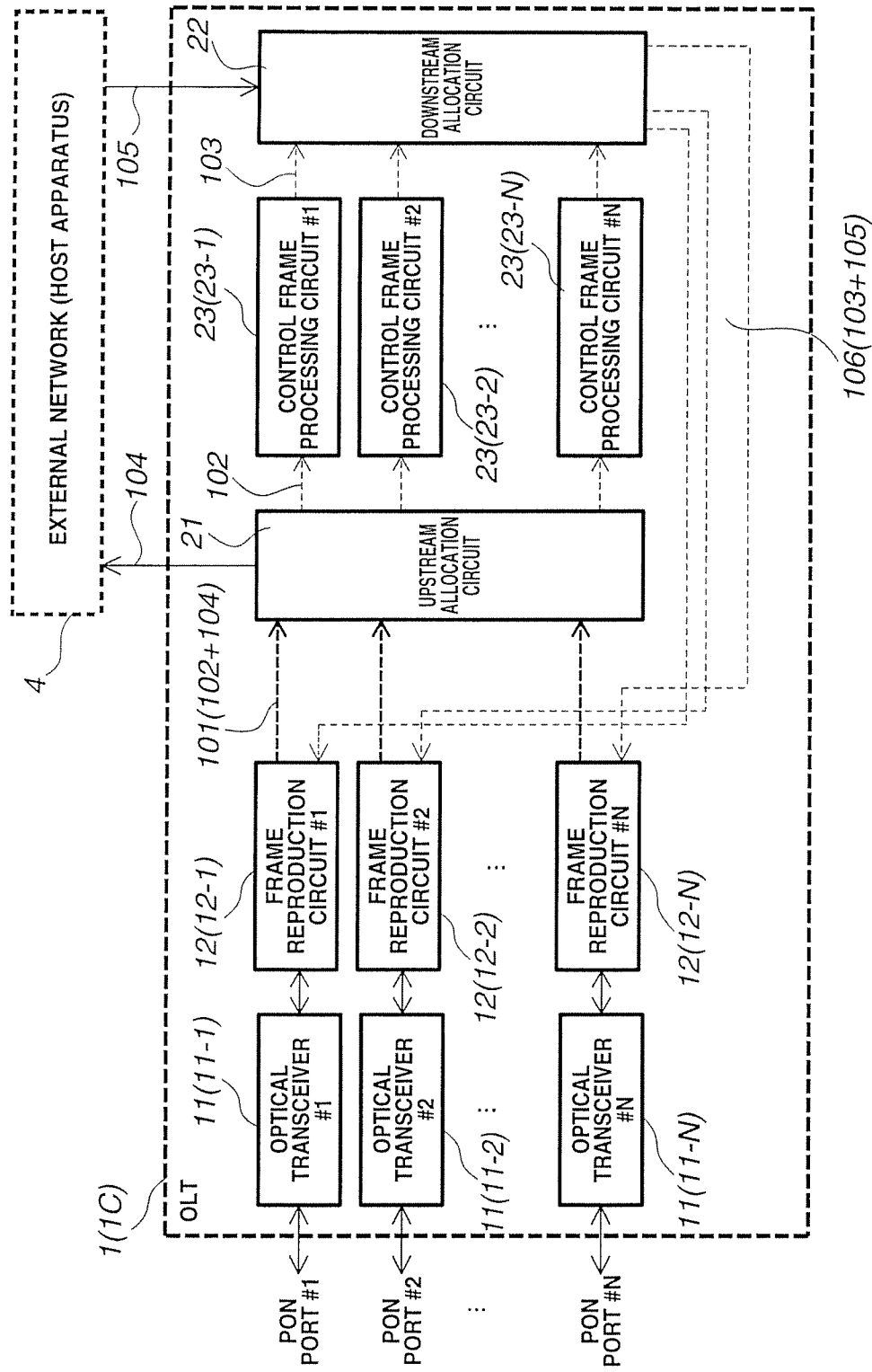
FIG. 8 is a block diagram showing the basic arrangement of a station-side apparatus (OLT) in an optical transmission system according to the third embodiment of the present invention.

FIG. 8 shows the basic arrangement of an OLT 1 (1C) according to the third embodiment. In the OLT 1 (1A and 1B) according to the first and second embodiments, only the components related to the control frame processing are shown. In the OLT 1C according to the third embodiment, however, components related to data frame processing are also shown.

Note that in the OLT 1C according to the third embodiment, an upstream allocation circuit 21 corresponds to the upstream allocation circuit 14 according to the first and second embodiments, and a downstream allocation circuit 22 corresponds to the downstream allocation circuit 15. Control frame processing circuits 23 (23-1 to 23-N) correspond to the control frame processing circuits 131 (131-1 to 131-N) in the PON control circuits 13 (13-1 to 13-N) according to the first and second embodiments. In addition, an external network 4 is connected as a host apparatus to the OLT 1C. The external network 4 will be referred to as the host apparatus 4 hereinafter.

In the OLT 1C, the upstream allocation circuit 21 receives a superimposed frame (upstream superimposed frame) 101 obtained by bundling upstream frames (upstream control frames 102+upstream data frames 104) from all ONUs 3 input via one of frame reproduction circuits 12-1 to 12-N, and allocates each of the upstream control frames 102 included in the upstream frames bundled into the upstream superimposed frame 101 to the predetermined control frame processing circuit 23 based on a PON port number added to the frame.

The PON port number has a value of 1 to N predetermined for each ONU 3, and can be generated by replacing the individual identification number or the like of the ONU 3 in the frame. The upstream allocation circuit 21 outputs, to the host apparatus 4, the upstream data frames 104 included in the upstream frames bundled into the upstream superimposed frame 101.

The downstream allocation circuit 22 allocates, to the preset predetermined frame reproduction circuit 12, each of downstream control frame 103 output from the control frame processing circuits 23 to which the upstream control frame 102 has been allocated, and outputs the downstream control frame 103 as a superimposed frame (downstream superimposed frame) 106 to the frame reproduction circuit 12 together with a downstream data frame 105 input from the host apparatus 4.

Figure 9:
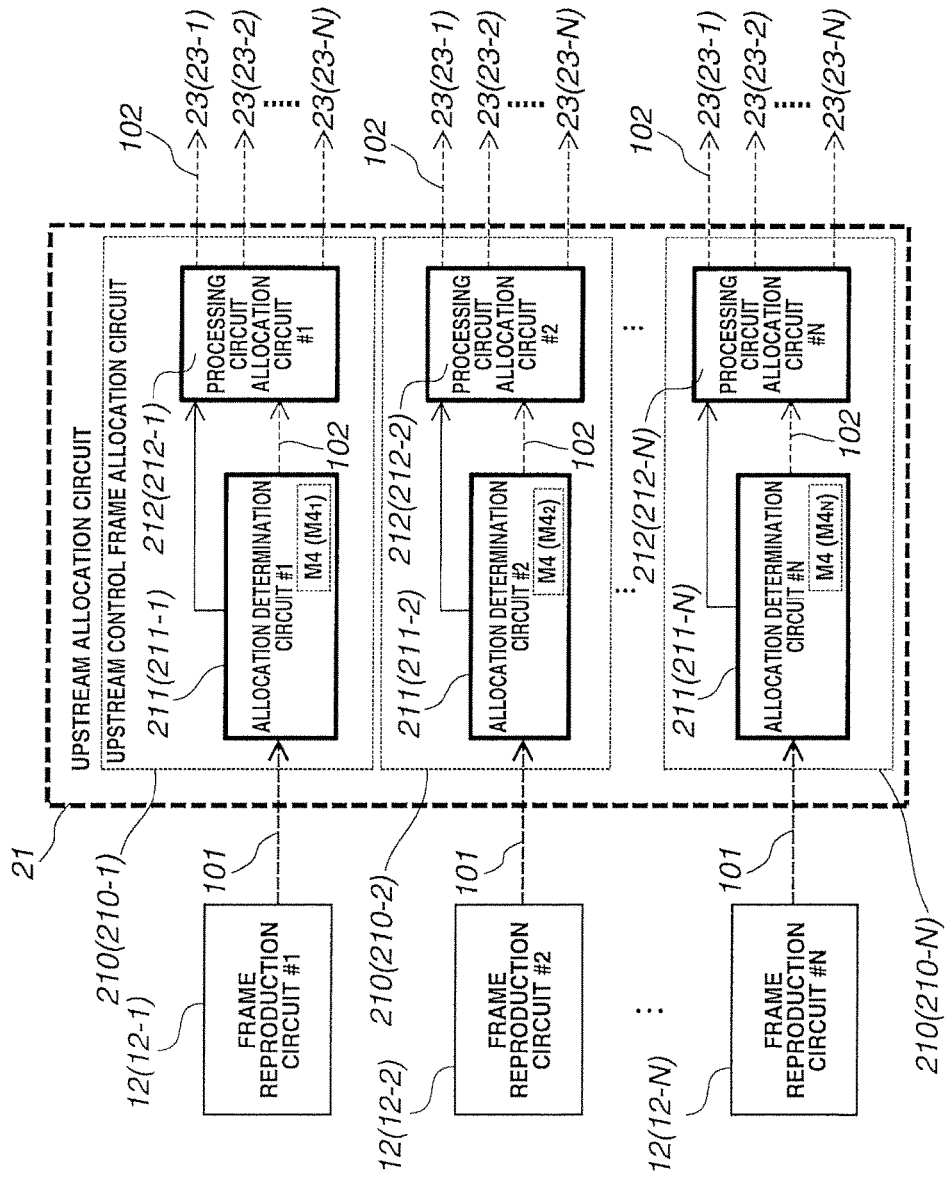
FIG. 9 is a block diagram showing examples of components related to the upstream control frame processing of an upstream allocation circuit in the OLT according to the third embodiment.

FIG. 9 shows examples of components related to the upstream control frame processing of the upstream allocation circuit 21. The upstream allocation circuit 21 includes N upstream control frame allocation circuits 210 (210-1 to 210-N) equal in number to the PON ports. Each upstream control frame allocation circuit 210 (210-1 to 210-N) includes an allocation determination circuit 211 (211-1 to 211-N) and a processing circuit allocation circuit 212 (212-1 to 212-N). The allocation determination circuits 211-1 to 211-N are provided in correspondence with the processing circuit allocation circuits 212-1 to 212-N.

Upon receiving the upstream superimposed frame 101 via each frame reproduction circuit 12 (12-1 to 12-N), the corresponding allocation determination circuit 211 (211-1 to 211-N) extracts an identifier stored in a preamble region or the like of each upstream control frame 102 bundled into the upstream superimposed frame 101, and designates, for the corresponding processing circuit allocation circuit 212 (212-1 to 212-N), a control frame processing circuit number corresponding to the value of the identifier as the allocation destination of the upstream control frame 102. Each allocation determination circuit 211 (211-1 to 211-N) includes a memory M4 ($M4_1$ to $M4_N$), and the control frame processing circuit number of the allocation destination corresponding to the value of the extracted identifier is written in the memory M4 ($M4_1$ to $M4_N$).

Note that an Ethernet®-PON system can use an LLID as an identifier. If each frame reproduction circuit 12 (12-1 to 12-N) converts an LLID into an ID usable in the OLT 1C and stores it in the preamble region or the like, the ID stored in the preamble region can be used as an identifier. In another PON system as well, if an ID for identifying the ONU 3 is added to each upstream control frame 102, the ID can be used as an identifier.

Each processing circuit allocation circuit 212 (212-1 to 212-N) receives the designation of the allocation destination from the corresponding allocation determination circuit 211 (211-1 to 211-N), and outputs, to the designated control frame processing circuit 23, the upstream control frame 102 having undergone the allocation destination determination processing and sent from the corresponding allocation determination circuit 211 (211-1 to 211-N). This arrangement can output the arbitrary upstream control frame 102 to the arbitrary control frame processing circuit 23.

Figure 10:
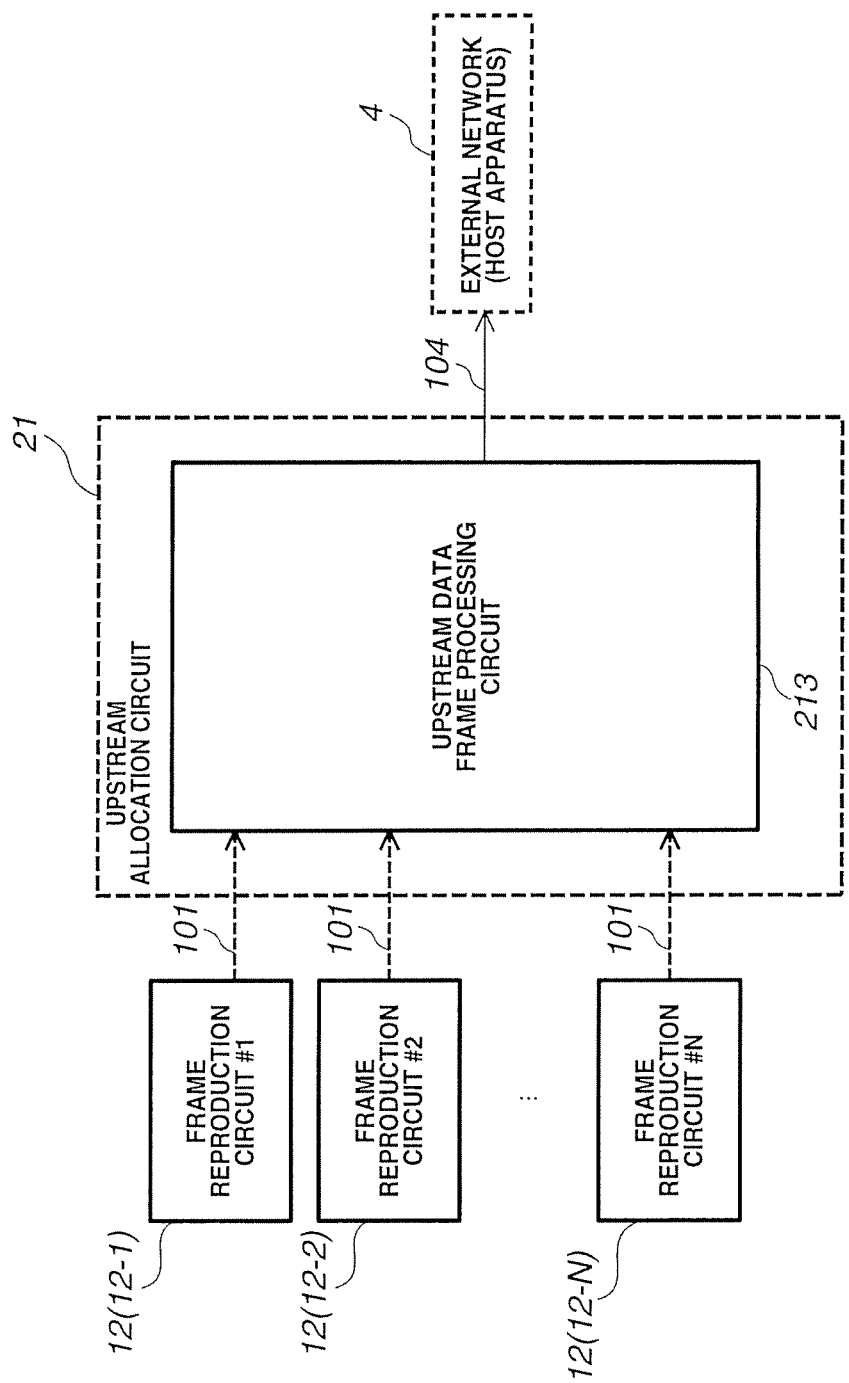
FIG. 10 is a block diagram showing examples of components related to the upstream data frame processing of the upstream allocation circuit in the OLT according to the third embodiment.

FIG. 10 shows examples of components related to the upstream data frame processing of the upstream allocation circuit 21. The upstream allocation circuit 21 includes an upstream data frame processing circuit 213 in addition to the components shown in FIG. 9. Upon receiving the upstream superimposed frame 101 via each frame reproduction circuit 12 (12-1 to 12-N), the upstream data frame processing circuit 213 performs buffering processing, bridge processing, and the like for each upstream data frame 104 bundled into the upstream superimposed frame 101, and outputs the processed upstream data frame 104 to the host apparatus 4.

Figure 11:
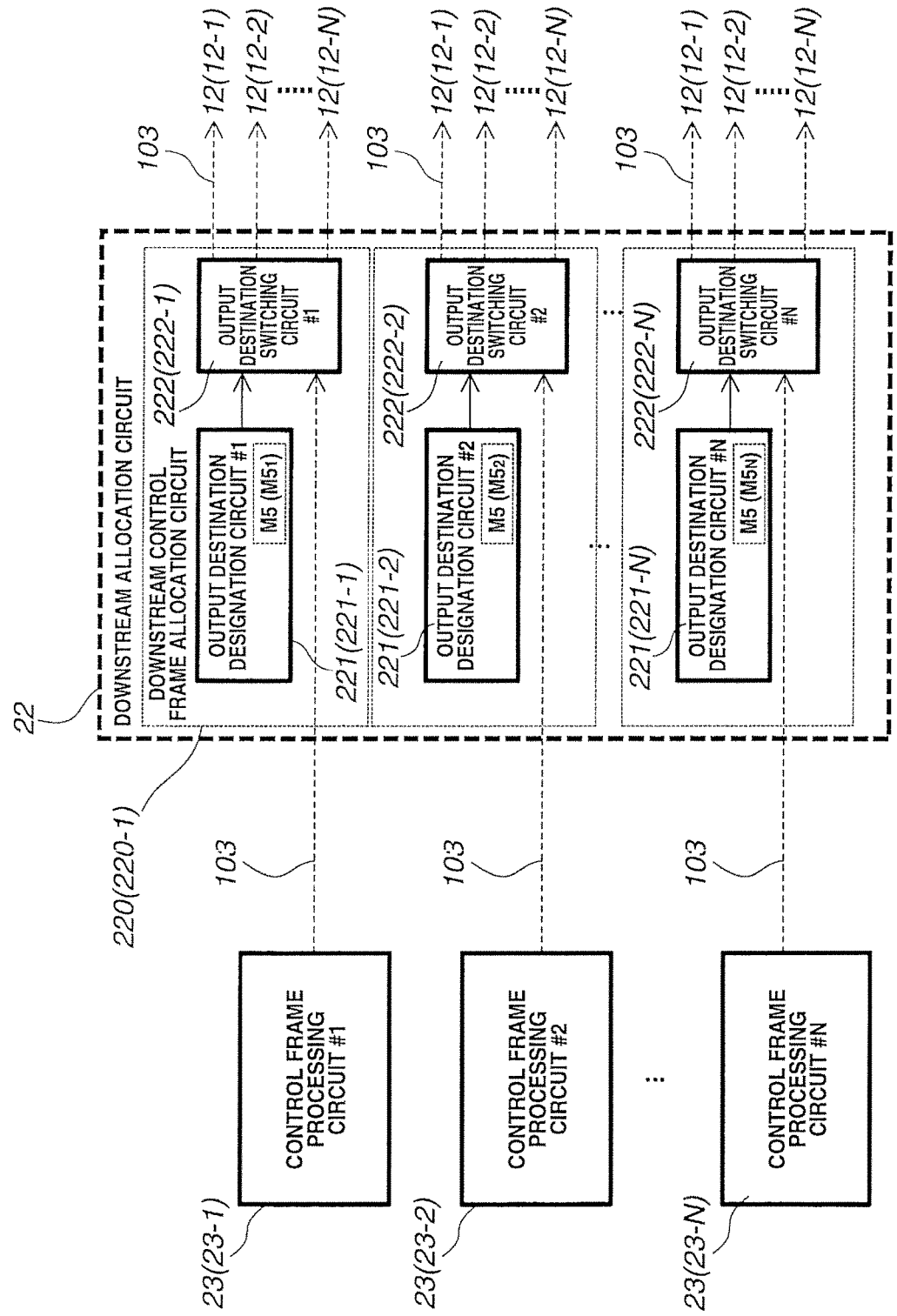
FIG. 11 is a block diagram showing examples of components related to the downstream control frame processing of a downstream allocation circuit in the OLT according to the third embodiment.

FIG. 11 shows examples of components related to the downstream control frame processing of the downstream allocation circuit 22. The downstream allocation circuit 22 includes N downstream control frame allocation circuits 220 (220-1 to 220-N) equal in number to the control frame processing circuits 23. Each downstream control frame allocation circuit 220 (220-1 to 220-N) includes an output destination designation circuit 221 (221-1 to 221-N) and an output destination switching circuit 222 (222-1 to 222-N). The output destination designation circuits 221-1 to 221-N are provided in correspondence with the output destination switching circuit 222-1 to 222-N.

Each output destination switching circuit 222 (222-1 to 222-N) outputs, to the preset frame reproduction circuit 12 designated by the corresponding output destination designation circuit 221 (221-1 to 221-N), the downstream control frame 103 from the corresponding control frame processing circuit 23 (23-1 to 23-N). Each output destination designation circuit 221 (221-1 to 221-N) includes a memory M5 ($M5_1$ to $M5_N$), and the frame reproduction circuit number of the output destination is written in the memory M5 ($M5_1$ to $M5_N$). This arrangement can output, to the same frame reproduction circuit 12, all the downstream control frames 103 from the same control frame processing circuit 23.

Figure 12:
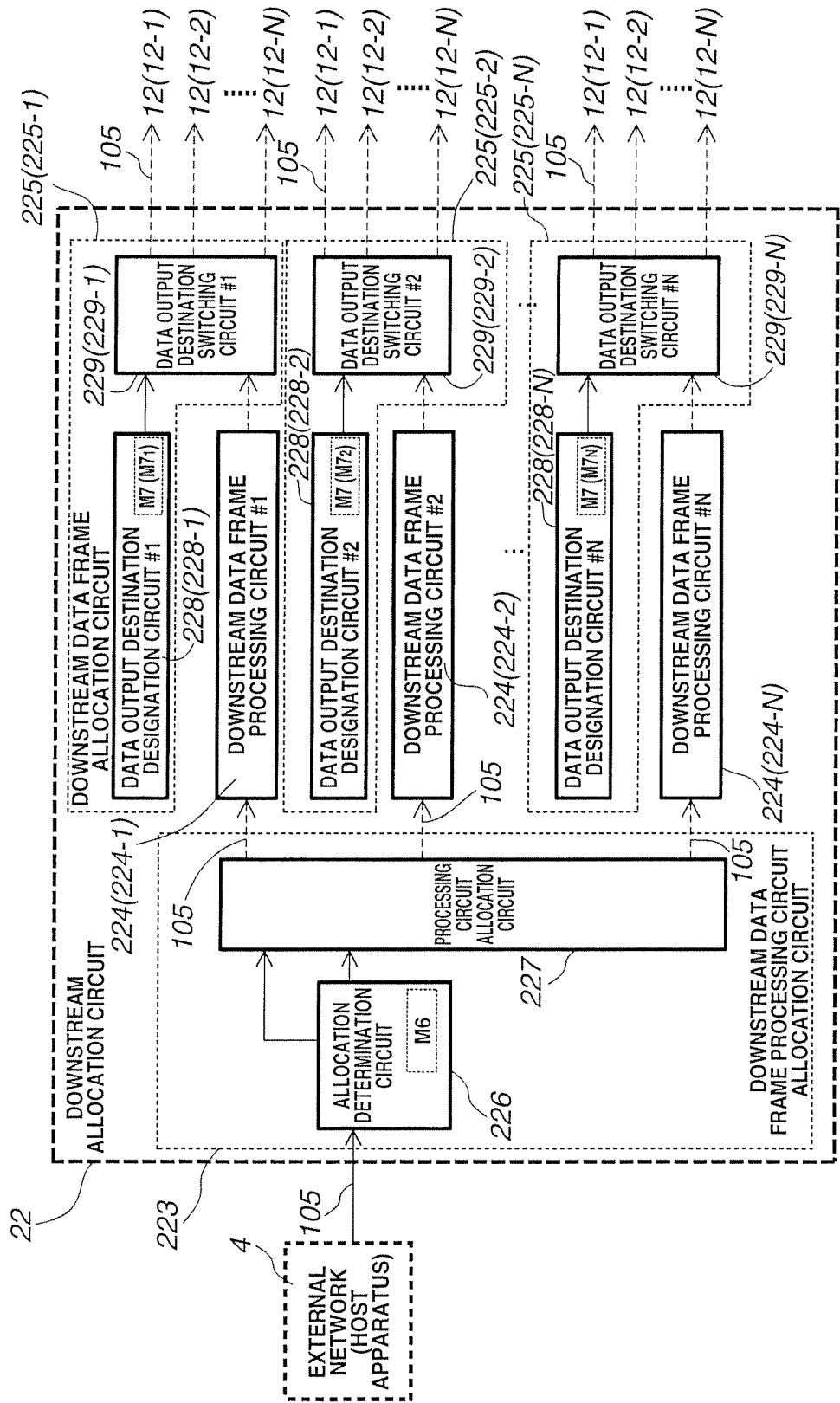
FIG. 12 is a block diagram showing examples of components related to the downstream data frame processing of the downstream allocation circuit in the OLT according to the third embodiment.

FIG. 12 shows examples of components related to the downstream data frame processing of the downstream allocation circuit 22. The downstream allocation circuit 22 includes a downstream data frame processing circuit allocation circuit 223, N downstream data frame processing circuits 224 (224-1 to 224-N) equal in number to the PON ports, and N downstream data frame allocation circuits 225 (225-1 to 225-N) in addition to the components shown in FIG. 11. The downstream data frame processing circuit allocation circuit 223 includes an allocation determination circuit 226 and a processing circuit allocation circuit 227. Each downstream data frame allocation circuit 225 (225-1 to 225-N) includes a data output destination designation circuit 228 (228-1 to 228-N) and a data output destination switching circuit 229 (229-1 to 229-N). The data output destination designation circuits 228-1 to 228-N are provided in correspondence with the data output destination switching circuits 229-1 to 229-N.

Upon receiving the downstream data frame 105 from the host apparatus 4 of the OLT 1C, the allocation determination circuit 226 extracts an identifier stored in the tag or the like of the downstream data frame 105, and designates, for the processing circuit allocation circuit 227, a downstream data frame processing circuit number corresponding to the value of the identifier as the allocation destination of the downstream data frame 105. The allocation determination circuit 226 includes a memory M6, and the downstream data frame processing circuit number of the allocation destination corresponding to the value of the extracted identifier is written in the memory M6.

Note that the identifier need only be information capable of identifying the ONU 3 or a user-side terminal connected to the ONU 3. In the Ethernet-PON system, the VLAN (Virtual Local Area Network)-ID of a VLAN tag added to the downstream data frame 105 or the destination MAC address of the downstream data frame 105 can be used as an identifier. If the host apparatus 4 of the OLT 1C stores an ID for identifying the ONU 3 in the preamble region or the like, the ID stored in the preamble region can be used. In another PON system as well, if an ID for identifying the ONU 3 is added to each downstream data frame 105, the ID can be used as an identifier.

The processing circuit allocation circuit 227 receives the designation of the allocation destination from the allocation determination circuit 226, and outputs, to the designated downstream data frame processing circuit 224, the downstream data frame 105 having undergone the allocation destination determination processing and sent from the allocation determination circuit 226. This arrangement can output the arbitrary downstream data frame 105 to the arbitrary downstream data frame processing circuit 224.

Each data output destination switching circuit 229 (229-1 to 229-N) outputs, to the preset frame reproduction circuit 12 designated by the corresponding data output destination designation circuit 228 (228-1 to 228-N), the downstream data frame 105 from the corresponding downstream data frame processing circuit 224 (224-1 to 224-N). Each data output destination designation circuit 228 (228-1 to 228-N) includes a memory M7 ($M7_1$ to $M7_N$), and the frame reproduction circuit number of the output destination is written in the memory M7 ($M7_1$ to $M7_N$). This arrangement can output, to the same frame reproduction circuit 12, all the downstream data frames 105 from the same downstream data frame processing circuit 224.

Figure 13:
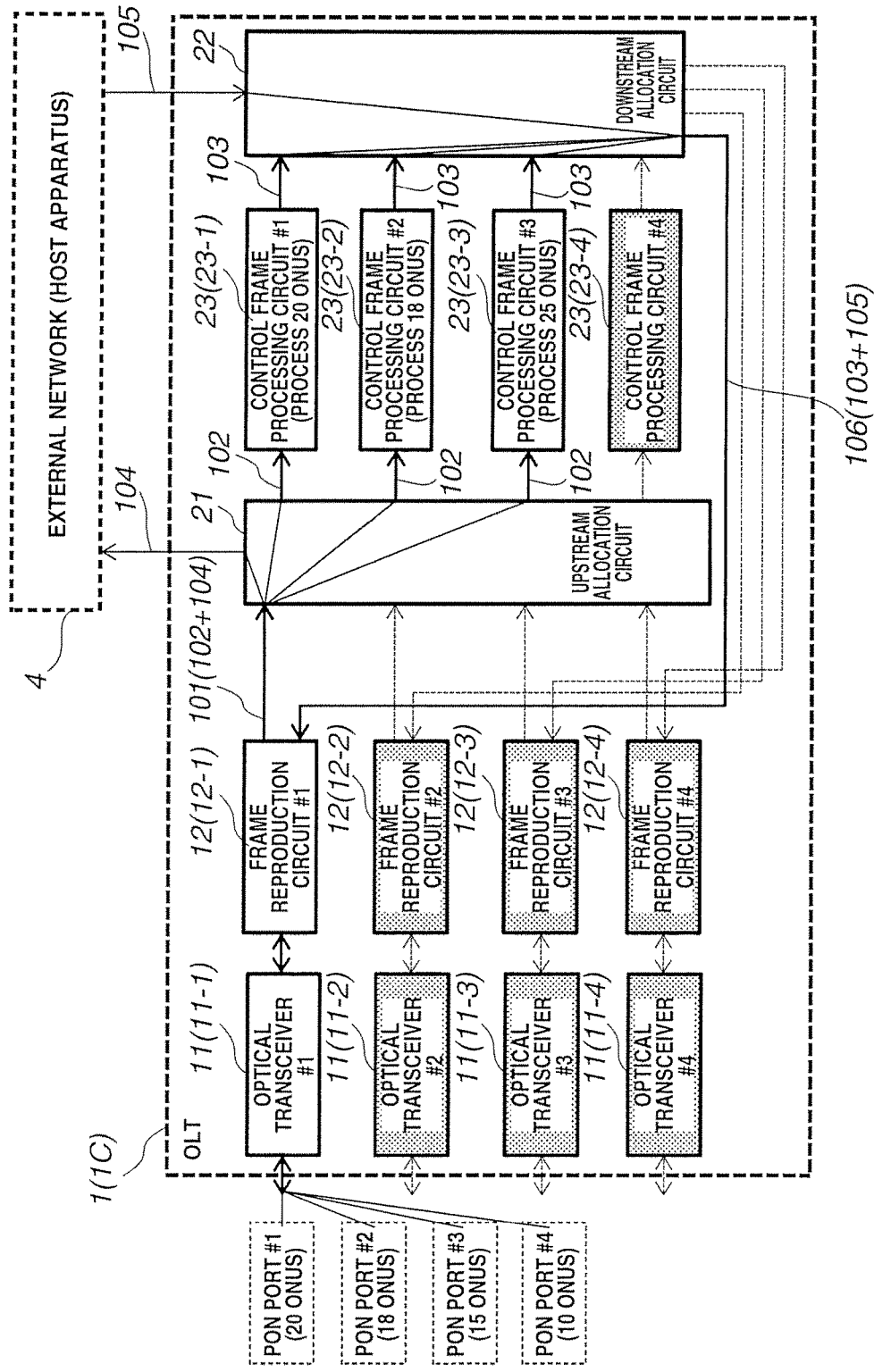
FIG. 13 is a block diagram for explaining an example of the operation of the OLT according to the third embodiment.

An example of the operation of the OLT 1C according to the first embodiment will be described next with reference to FIG. 13. As a practical example, assume a 4-PON port OLT in which the maximum number of accommodated ONUs for one PON port is 32. That is, each control frame processing circuit 23 has processing capability corresponding to the number of frames to be processed in the 32 ONUs 3 and the OLT 1C can accommodate the 128 ONUs 3 at most. PON ports #1 to #4 of the OLT 1C are connected to the 20 ONUs 3, 18 ONUs 3, 15 ONUs 3, and 10 ONUs 3, respectively.

Upstream control frames from the ONUs 3 connected to PON port #1 are added with "1 to 20" as LLIDs, upstream control frames from the ONUs 3 connected to PON port #2 are added with "101 to 118" as LLIDs, upstream control frames from the ONUs 3 connected to PON port #3 are added with "201 to 215" as LLIDs, and upstream control frames from the ONUs 3 connected to PON port #4 are added with "301 to 310" as LLIDs.

Furthermore, assume that optical transmission processes with the ONUs 3 connected to the respective PON ports are all assigned to PON port #1 and operated, upstream frames from all the ONUs 3 are bundled into the upstream superimposed frame 101 (upstream control frames 102+upstream data frames 104) at the stage of optical signals, and input to the upstream allocation circuit 21 via the optical transceiver 11-1 and the frame reproduction circuit 12-1, and downstream frames (downstream control frames 103+downstream data frames 105) to all the ONUs 3 are bundled into the downstream superimposed frame 106 at the stage of electrical signals output from the downstream allocation circuit 22, and output to all the ONUs 3 via the frame reproduction circuit 12-1 and the optical transceiver 11-1. That is, in the OLT 1C, the number of optical transceivers 11 and the number of frame reproduction circuits 12 for reproducing the frame converted into the electrical signal by the optical transceiver 11 are one.

In the upstream allocation circuit 21 (see FIG. 9), upon receiving the superimposed frame 101 via the frame reproduction circuit 12-1, the allocation determination circuit 211-1 determines the LLID extracted from the preamble region of each upstream control frame 102 bundled into the superimposed frame 101, and designates, for the processing circuit allocation circuit 212-1, a control frame processing circuit number corresponding to the value of the LLID as the allocation destination of the upstream control frame 102.

Assume that the control frame processing circuit numbers of the allocation destinations corresponding to the LLIDs are written in the memory $M4_1$ of the allocation determination circuit 211-1 of the upstream allocation circuit 21 so as to output the upstream control frames 102 having the LLIDs "1 to 20" to the control frame processing circuit 23-1, output the upstream control frames 102 having the LLIDs "101 to 118" to the control frame processing circuit 23-2, and output the upstream control frames 102 having the LLIDs "201 to 215" and "301 to 310" to the control frame processing circuit 23-3.

In this case, the allocation determination circuit 211-1 allocates, to the control frame processing circuit 23-1, the upstream control frames 102 from the 20 ONUs 3 connected to PON port #1 before all the ONUs 3 are assigned to PON port #1. Similarly, the upstream control frames 102 from the 18 ONUs 3 connected to PON port #2 before all the ONUs 3 are assigned to PON port #1 are allocated to the control frame processing circuit 23-2. The upstream control frames 102 from the 15 ONUs 3 connected to PON port #3 before all the ONUs 3 are assigned to PON port #1 and the 10 ONUs 3 connected to PON port #4 before all the ONUs 3 are assigned to PON port #1 are allocated to the control frame processing circuit 23-3.

Consequently, the control frame processing circuit 23-1 processes the upstream control frames 102 corresponding to the 20 ONUs, the control frame processing circuit 23-2 processes the upstream control frames 102 corresponding to the 18 ONUs, and the control frame processing circuit 23-3 processes the upstream control frames 102 corresponding to the 25 (=15+10) ONUs. The control frame processing circuits 23-1 to 23-3 output the processed downstream control frames 103 to the downstream allocation circuit 22.

In the downstream allocation circuit 22 (see FIG. 11), the downstream control frames 103 from the control frame processing circuits 23-1 to 23-3 are input to the output destination switching circuits 222-1 to 222-3, respectively. The output destination switching circuits 222-1 to 222-3 allocate the downstream control frames 103 from the control frame processing circuits 23-1 to 23-3 to the preset frame reproduction circuits 12 designated by the output destination designation circuits 221-1 to 221-3, respectively.

In this example, the frame reproduction circuit 12-1 serving as the output source of the upstream superimposed frame 101 is set as the frame reproduction circuit 12 of the output destination in all the output destination designation circuits 221-1 to 221-N. This outputs, to the frame reproduction circuit 12-1, all the downstream control frames 103 input to the downstream allocation circuit 22.

Figure 14:
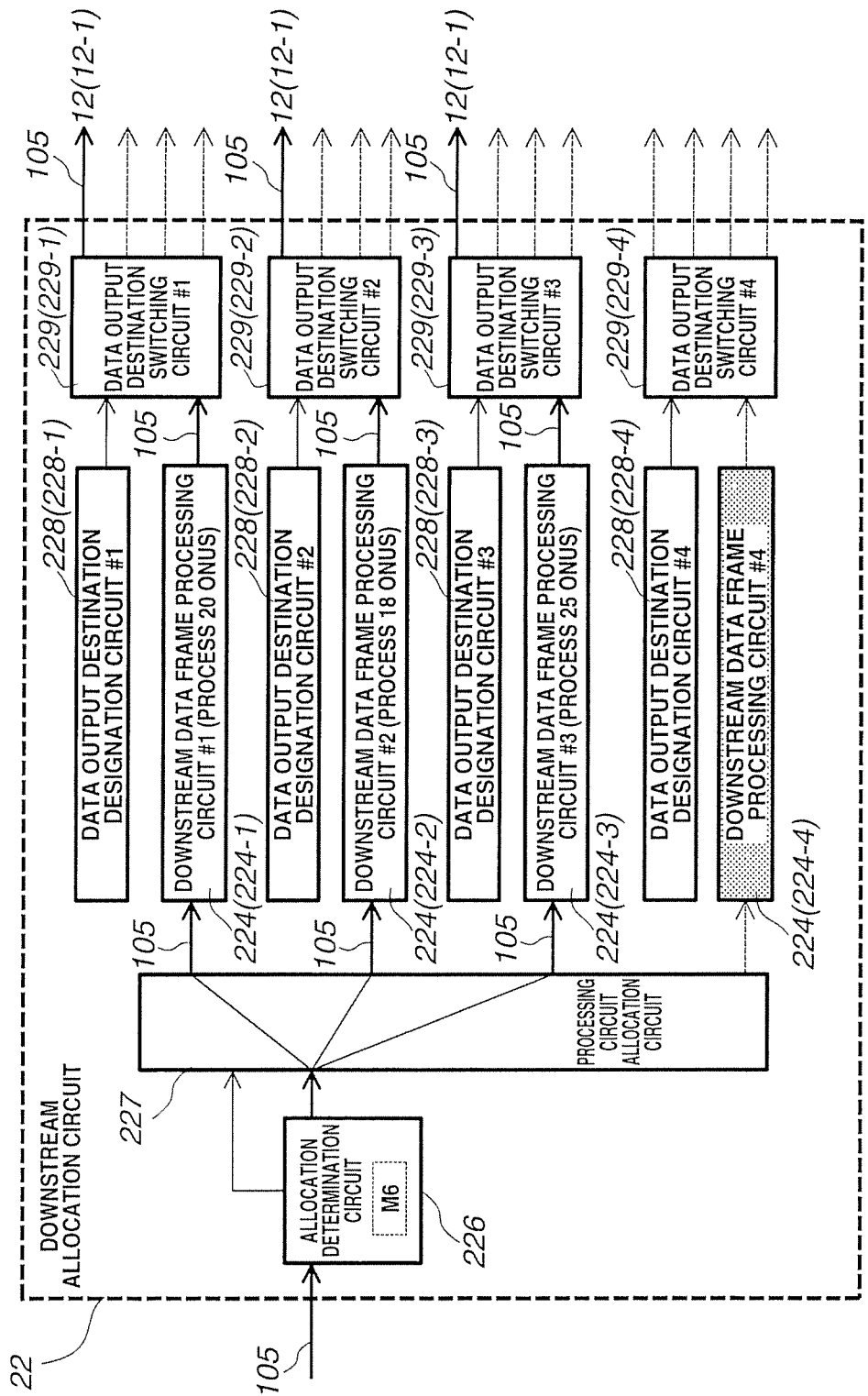
FIG. 14 is a block diagram for explaining an example of an operation related to the downstream data frame processing of the downstream allocation circuit in the OLT according to the third embodiment.

An example of an operation related to the downstream data frame processing in the downstream allocation circuit 22 will be described with reference to FIG. 14. In accordance with the criterion that the maximum number of accommodated ONUs for one PON port is 32, each downstream data frame processing circuit 224 has processing capability corresponding to the number of frames to be processed in the 32 ONUs 3, similarly to the control frame processing circuit 23. As for the downstream data frames 105 output from the host apparatus 4 to the OLT 1C, the downstream data frames 105 to the ONUs 3 connected to PON port #1 are added with VLAN tags having VLAN-IDs "1 to 20", the downstream data frames 105 to the ONUs 3 connected to PON port #2 are added with VLAN tags having VLAN-IDs "101 to 118", the downstream data frames 105 to the ONUs 3 connected to PON port #3 are added with VLAN tags having VLAN-IDs "201 to 215", and the downstream data frames 105 to the ONUs 3 connected to PON port #4 are added with VLAN tags having ULAN-IDs "301 to 310".

In the downstream allocation circuit 22, upon receiving the downstream data frame 105 from the host apparatus 4, the allocation determination circuit 226 determines the VLAN-ID extracted from the VLAN tag of the downstream data frame 105, and designates, for the processing circuit allocation circuit 227, a downstream data frame processing circuit number corresponding to the value of the VLAN-ID as the allocation destination of the downstream data frame 105.

Assume that the downstream data frame processing circuit numbers of the allocation destinations corresponding to the VLAN-IDs are written in the memory M6 of the allocation determination circuit 226 of the downstream allocation circuit 22 so as to output the downstream data frames 105 having the VLAN-IDs "1 to 20" to the downstream data frame processing circuit 224-1, output the downstream data frames 105 having the VLAN-IDs "101 to 118" to the downstream data frame processing circuit 224-2, and output the downstream data frames 105 having the VLAN-IDs "201 to 215" and "301 to 310" to the downstream data frame processing circuit 224-3.

In this case, the allocation determination circuit 226 allocates, to the downstream data frame processing circuit 224-1, the downstream data frames 105 to the 20 ONUs 3 connected to PON port #1 before all the ONUs 3 are assigned to PON port #1. Similarly, the downstream data frames 105 to the 18 ONUs 3 connected to PON port #2 before all the ONUs 3 are assigned to PON port #1 are allocated to the downstream data frame processing circuit 224-2. The downstream data frames 105 to the 15 ONUs 3 connected to PON port #3 before all the ONUs 3 are assigned to PON port #1 and the 10 ONUs 3 connected to PON port #4 before all the ONUs 3 are assigned to PON port #1 are allocated to the downstream data frame processing circuit 224-3.

Consequently, the downstream data frame processing circuit 224-1 processes the downstream data frames 105 corresponding to the 20 ONUs, the downstream data frame processing circuit 224-2 processes the downstream data frames 105 corresponding to the 18 ONUs, and the downstream data frame processing circuit 224-3 processes the downstream data frames 105 corresponding to the 25 (=15+10) ONUs. The processed downstream data frames 105 are output to the data output destination switching circuits 229-1 to 229-3.

The data output destination switching circuits 229-1 to 229-3 allocate, to the preset frame reproduction circuits 12 designated by the data output destination designation circuits 228-1 to 228-3, the downstream data frames 105 from the downstream data frame processing circuits 224-1 to 224-3, respectively.

In this example, the frame reproduction circuit 12-1 serving as the output source of the upstream superimposed frame 101 is set as the frame reproduction circuit 12 of the output destination in all the data output destination designation circuits 228-1 to 228-N. This outputs, to the frame reproduction circuit 12-1, all the downstream data frames 105 input to the downstream allocation circuit 22.

In the OLT 1C, although the number of accommodated ONUs for one PON port is 32 and the maximum number of accommodated ONUs of the whole OLT is 128, the 63 ONUs 3 are accommodated in total. However, the operation by assigning the ONUs to PON port #1 increases the number of accommodated ONUs for one PON port to 63. This can power off unused circuits in advance.

That is, in this operation example, circuits used in the OLT 1C are the optical transceiver 11-1, the frame reproduction circuit 12-1, the control frame processing circuits 23-1 to 23-3, the upstream allocation circuit 21, and the downstream allocation circuit 22. The remaining circuits (the optical transceivers 11-2 to 11-4, the frame reproduction circuits 12-2 to 12-4, and the control frame processing circuit 23-4) can be powered off.

Furthermore, the use efficiency of the control frame processing circuit 23-3 is improved by allocation, to the control frame processing circuit 23-3, the upstream control frames 102 from the 15 ONUs 3 connected to PON port #3 and the 10 ONUs 3 connected to PON port #4 to process them. Along with the improvement of the use efficiency of the control frame processing circuit 23-3, there exists the control frame processing circuit 23-4 as the control frame processing circuit 23 unnecessary to be used. By powering off the control frame processing circuit 23-4 in advance, it is possible to eliminate the waste of power.

In addition, the use efficiency of the downstream data frame processing circuit 224-3 is improved by allocation, to the downstream data frame processing circuit 224-3, the downstream data frames 105 to the 15 ONUs 3 connected to PON port #3 and the 10 ONUs 3 connected to PON port #4 to process them. Along with the improvement of the use efficiency of the downstream data frame processing circuit 224-3, there exists the downstream data frame processing circuit 224-4 as a downstream data frame processing circuit unnecessary to be used. By powering off the downstream data frame processing circuit 224-4 in advance, it is possible to eliminate the waste of power.

In the above-described operation example, the system form in which the operation is performed by assigning the ONUs to one PON port (PON port #1) has been explained. The present invention, however, is not limited to this. For example, the ONUs may be assigned to two PON ports. If the ONUs are assigned to two PON ports, two upstream superimposed frames 101 obtained by dividing and bundling the upstream frames from all the ONUs 3 into two groups are input to the upstream allocation circuit 21 via the two frame reproduction circuits 12, and each upstream control frame 102 bundled into the two upstream superimposed frames 101 is allocated to the predetermined control frame processing circuit 23 based on information (LLID or the like) added to the frame. A system designer can arbitrarily decide specific PON ports to which the ONUs are assigned and a specific PON port corresponding to the frame reproduction circuit 12 to which each downstream superimposed frame 106 is to be output.

The above operation example has been explained using the practical numerical values. The numerical values in the operation example are merely examples, and other values can be used, as a matter of course.

Fourth Embodiment

Figure 15:
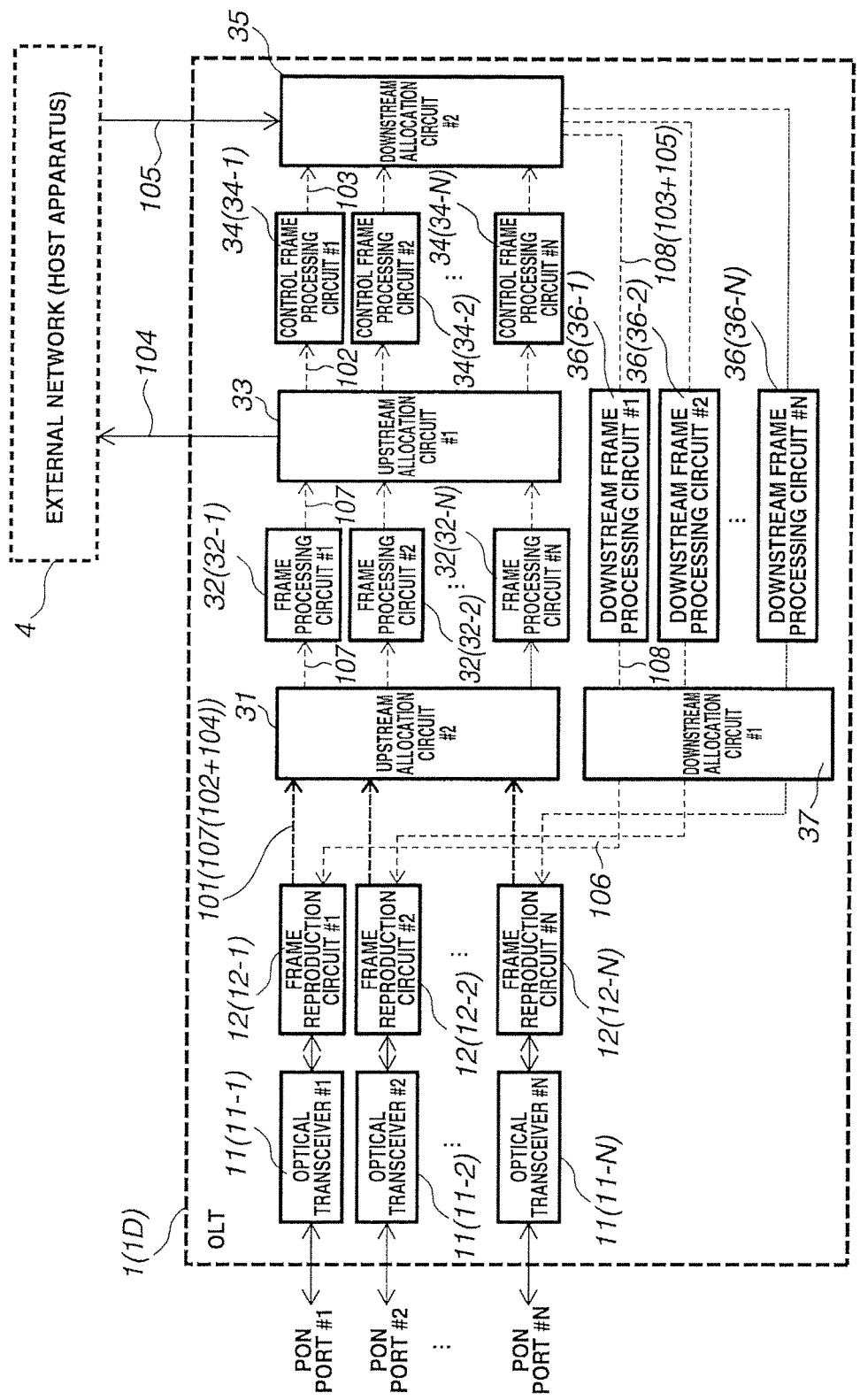
FIG. 15 is a block diagram showing the basic arrangement of a station-side apparatus (OLT) in an optical transmission system according to the fourth embodiment of the present invention.

FIG. 15 shows the basic arrangement of an OLT 1 (1D) according to the fourth embodiment. In the OLT 1D according to the fourth embodiment, control frame processing circuits 34 (34-1 to 34-N) correspond to the control frame processing circuits 23 (23-1 to 23-N) according to the third embodiment. Furthermore, in the OLT 1D according to the fourth embodiment, a first upstream allocation circuit 33 (upstream allocation circuit #1), a second upstream allocation circuit 31 (upstream allocation circuit #2), and N frame processing circuits 32 (32-1 to 32-N) are provided at the preceding stage of the control frame processing circuits 34 (34-1 to 34-N). Furthermore, a first downstream allocation circuit 37 (downstream allocation circuit #1), a second downstream allocation circuit 35 (downstream allocation circuit #2), and N downstream frame processing circuits 36 (36-1 to 36-N) are provided at the succeeding stage of control frame processing circuits 34 (34-1 to 34-N).

In the OLT 1D, the upstream allocation circuit 31 receives a superimposed frame (upstream superimposed frame) 101 obtained by bundling upstream frames input from all ONUs 3 via one of frame reproduction circuits 12-1 to 12-N, and allocates each upstream frame 107 (upstream control frame 102+upstream data frame 104) bundled into the upstream superimposed frame 101 to the predetermined frame processing circuit 32 based on a PON port number added to the frame. The PON port number has a value of 1 to N predetermined for each ONU 3, and can be generated by replacing the individual identification number or the like of the ONU 3 in the frame.

In the OLT 1D, the upstream allocation circuit 33 allocates the upstream control frame 102 included in each of the upstream frames 107 output from the frame processing circuits 32-1 to 32-N to the predetermined control frame processing circuit 34 based on the PON port number added to the frame. The upstream allocation circuit 33 also outputs, to a host apparatus 4, the upstream data frames 104 included in the upstream frames 107 output from the frame processing circuits 32-1 to 32-N.

Furthermore, in the OLT 1D, the downstream allocation circuit 35 allocates, to the preset predetermined downstream frame processing circuit 36, a downstream control frame 103 output from the control frame processing circuit 34 to which each upstream control frame 102 has been allocated, and outputs the downstream control frame 103 as a downstream frame 108 to the downstream frame processing circuit 36 together with a downstream data frame 105 input from the host apparatus 4. The downstream allocation circuit 37 outputs, to the preset predetermined frame reproduction circuit 12, each of the downstream frames 108 output from the downstream frame processing circuits 36-1 to 36-N.

Figure 16:
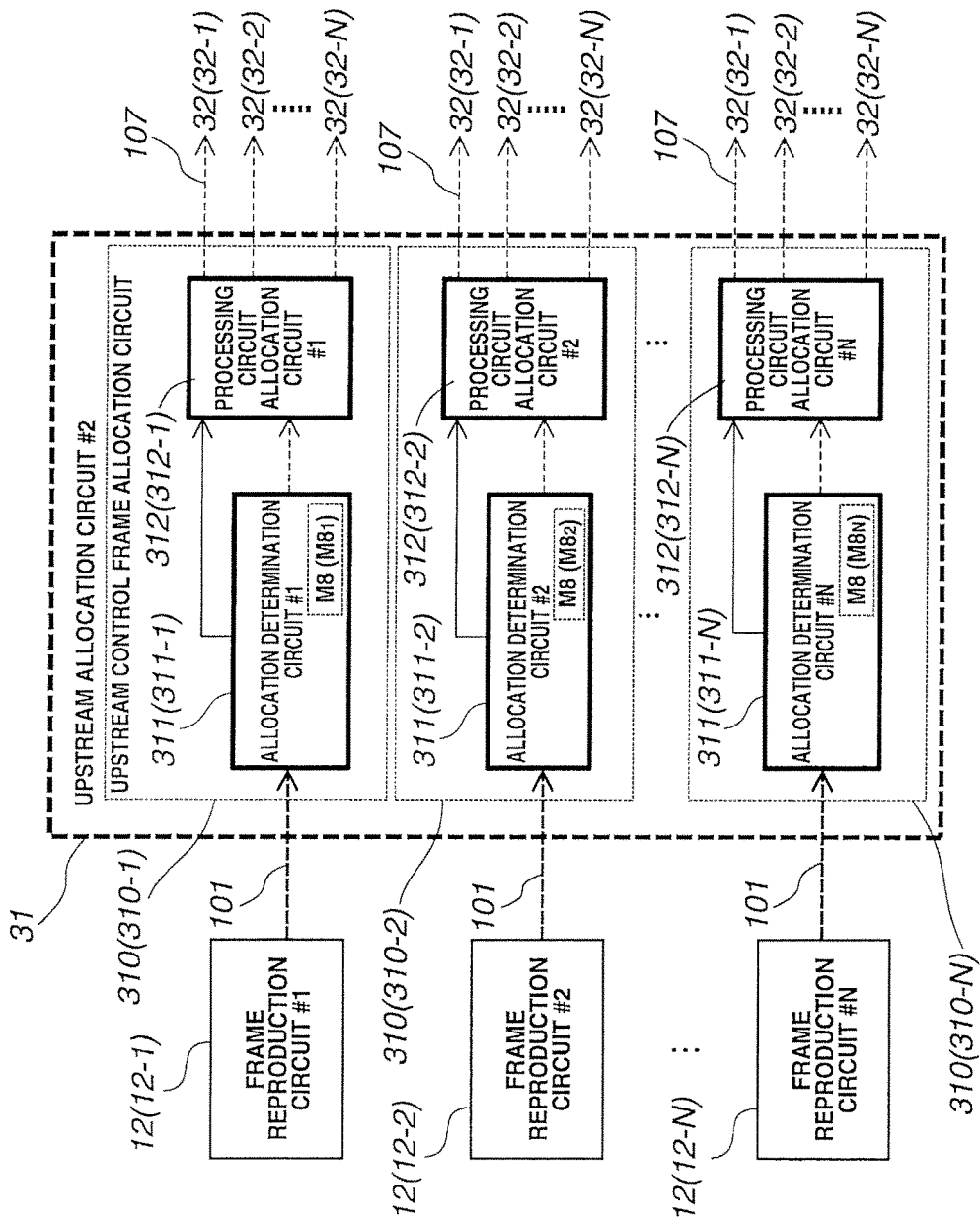
FIG. 16 is a block diagram showing examples of components related to the upstream control frame processing of upstream allocation circuit #2 in the OLT according to the fourth embodiment.

FIG. 16 shows examples of components related to the upstream frame processing of the upstream allocation circuit 31. The upstream allocation circuit 31 includes N upstream control frame allocation circuits 310 (310-1 to 310-N) equal in number to PON ports. Each upstream control frame allocation circuit 310 (310-1 to 310-N) includes an allocation determination circuit 311 (311-1 to 311-N) and a processing circuit allocation circuit 312 (312-1 to 312-N). The allocation determination circuits 311-1 to 311-N are provided in correspondence with the processing circuit allocation circuits 312-1 to 312-N.

Upon receiving the upstream superimposed frame 101 via each frame reproduction circuit 12 (12-1 to 12-N), the corresponding allocation determination circuit 311 (311-1 to 311-N) extracts an identifier stored in the preamble region or the like of each upstream frame 107 bundled into the upstream superimposed frame 101, and designates, for the corresponding processing circuit allocation circuit 312 (312-1 to 312-N), a frame processing circuit number corresponding to the value of the identifier as the allocation destination of the upstream frame 107. Each allocation determination circuit 311 (311-1 to 311-N) includes a memory M8 ($M8_1$ to $M8_N$), and the frame processing circuit number of the allocation destination corresponding to the value of the extracted identifier is written in the memory M8 ($M8_1$ to $M8_N$).

Note that an Ethernet-PON system can use an LLID as an identifier. If each frame reproduction circuit 12 (12-1 to 12-N) converts an LLID into an ID usable in the OLT 1D and stores it in the preamble region or the like, the ID stored in the preamble region can be used as an identifier. In another PON system as well, if an ID for identifying the ONU 3 is added to each upstream frame 107, the ID can be used as an identifier.

Each processing circuit allocation circuit 312 (312-1 to 312-N) receives the designation of the allocation destination from the corresponding allocation determination circuit 311 (311-1 to 311-N), and outputs, to the designated frame processing circuit 32, the upstream frame 107 having undergone the allocation destination determination processing and sent from the allocation determination circuit 311 (311-1 to 311-N). This arrangement can output the arbitrary upstream frame 107 to the arbitrary frame processing circuit 32.

Figure 17:
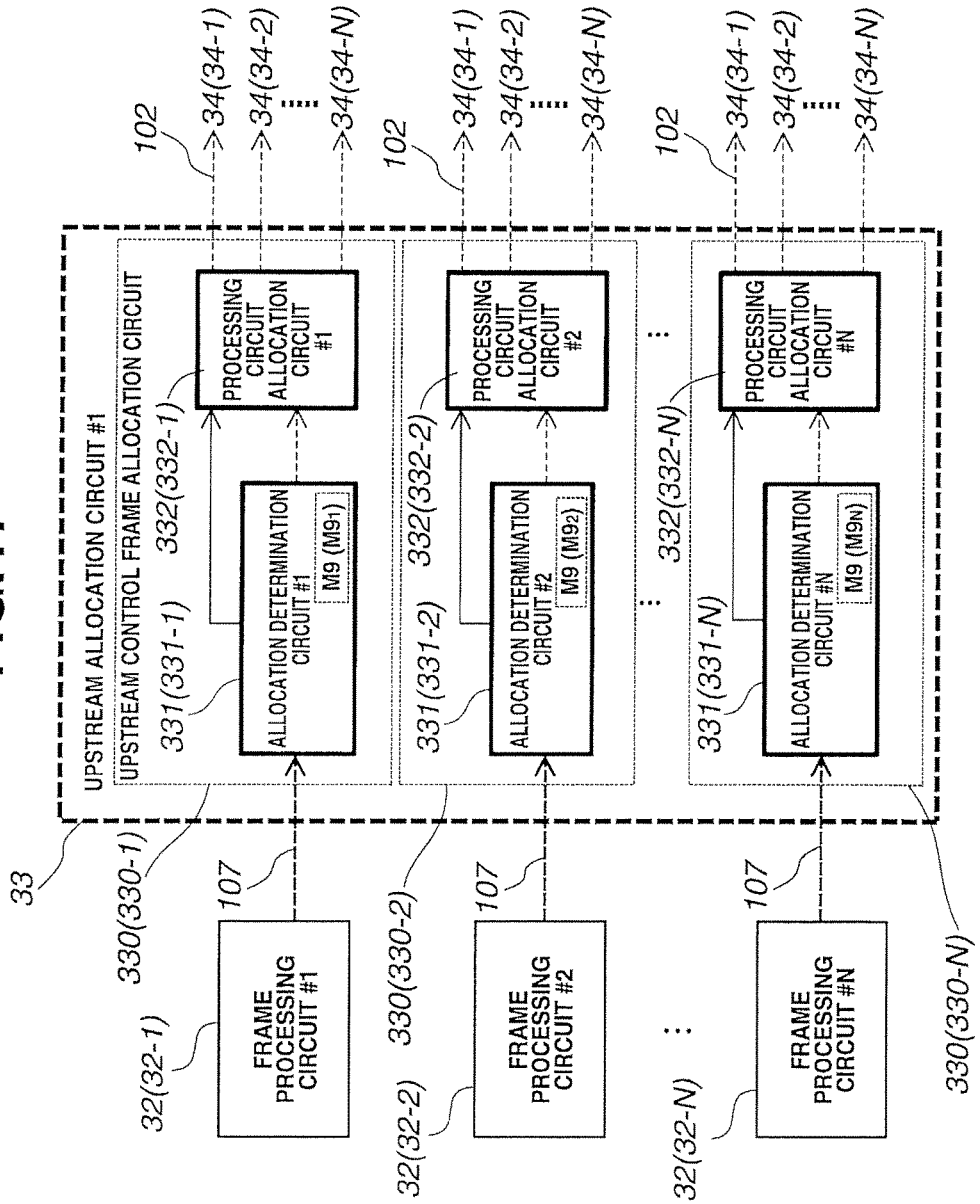
FIG. 17 is a block diagram showing examples of components related to the upstream control frame processing of upstream allocation circuit #1 in the OLT according to the fourth embodiment.

FIG. 17 shows examples of components related to the upstream control frame processing of the upstream allocation circuit 33. The upstream allocation circuit 33 includes N upstream control frame allocation circuits 330 (330-1 to 330-N) equal in number to the PON ports. Each upstream control frame allocation circuit 330 (330-1 to 330-N) includes an allocation determination circuit 331 (331-1 to 331-N) and a processing circuit allocation circuit 332 (332-1 to 332-N). The allocation determination circuits 331-1 to 331-N are provided in correspondence with the processing circuit allocation circuits 332-1 to 332-N.

Upon receiving the upstream frame 107 via each frame processing circuit 32 (32-1 to 32-N), the corresponding allocation determination circuit 331 (331-1 to 331-N) extracts an identifier stored in the preamble region or the like of the upstream frame 107, and designates, for the corresponding processing circuit allocation circuit 332 (332-1 to 332-N), a control frame processing circuit number corresponding the value of the identifier as the allocation destination of the upstream control frame 102 included in the upstream frame 107. Each allocation determination circuit 331 (331-1 to 331-N) includes a memory M9 (M9$_1$ to M9$_N$), and the control frame processing circuit number of the allocation destination corresponding to the value of the extracted identifier is written in the memory M9 (M9$_1$ to M9$_N$).

Note that the Ethernet-PON system can use an LLID as an identifier. If each frame reproduction circuit 12 (12-1 to 12-N) converts an LLID into an ID usable in the OLT 1D and stores it in the preamble region or the like, the ID stored in the preamble region can be used as an identifier. In another PON system as well, if an ID for identifying the ONU 3 is added to each upstream frame 107, the ID can be used as an identifier.

Each processing circuit allocation circuit 332 (332-1 to 332-N) receives the designation of the allocation destination from the corresponding allocation determination circuit 331 (331-1 to 331-N), and outputs, to the designated control frame processing circuit 34, the upstream control frame 102 having undergone the allocation destination determination processing and sent from the allocation determination circuit 331 (331-1 to 331-N). This arrangement can output the arbitrary upstream control frame 102 to the arbitrary control frame processing circuit 34.

Figure 18:
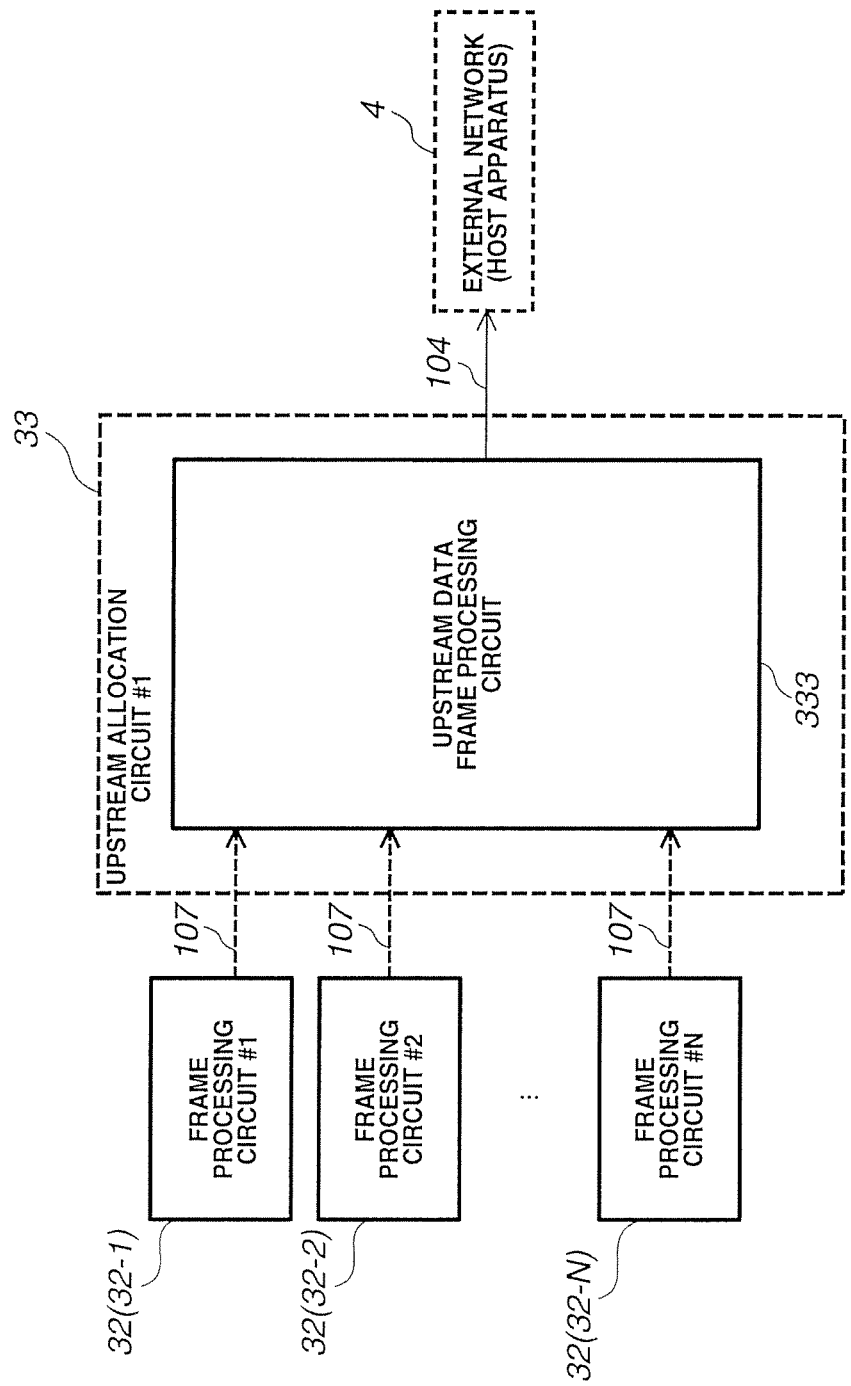
FIG. 18 is a block diagram showing examples of components related to the upstream data frame processing of upstream allocation circuit #1 in the OLT according to the fourth embodiment.

FIG. 18 shows examples of components related to upstream data frame processing of the upstream allocation circuit 33. The upstream allocation circuit 33 includes an upstream data frame processing circuit 333 in addition to the components shown in FIG. 17. Upon receiving the upstream frame 107 via each frame processing circuit 32 (32-1 to 32-N), the upstream data frame processing circuit 333 performs buffering processing, bridge processing, and the like for each upstream data frame 104 included in the upstream frame 107, and outputs the processed upstream data frame 104 to the host apparatus 4.

Figure 19:
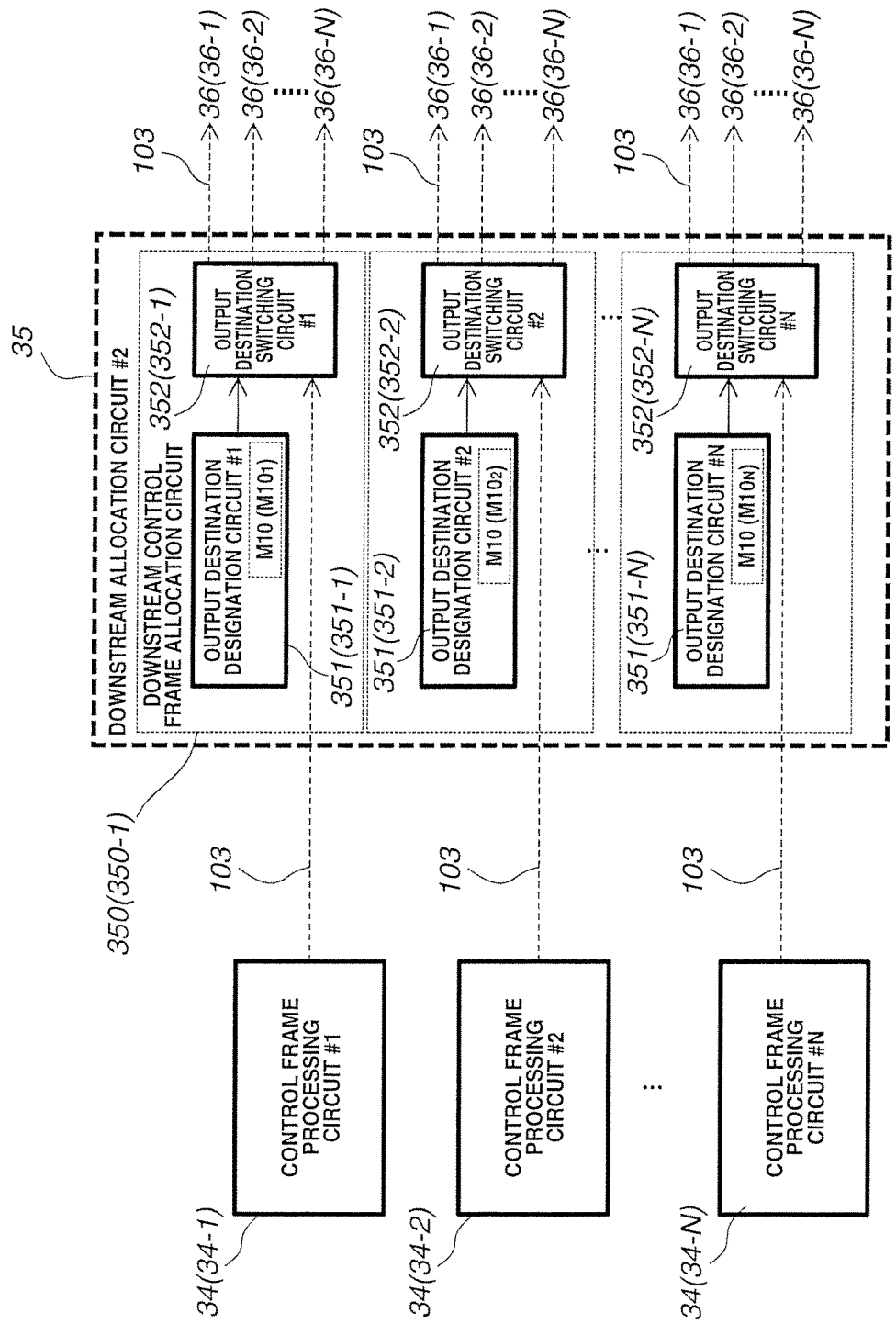
FIG. 19 is a block diagram showing examples of components related to the downstream control frame processing of downstream allocation circuit #2 in the OLT according to the fourth embodiment.

FIG. 19 shows examples of components related to processing of the downstream allocation circuit 35 for the downstream control frame 103. The downstream allocation circuit 35 includes N downstream control frame allocation circuits 350 (350-1 to 350-N) equal in number to the control frame processing circuits 34. Each downstream control frame allocation circuit 350 (350-1 to 350-N) includes an output destination designation circuit 351 (351-1 to 351-N) and an output destination switching circuit 352 (352-1 to 352-N). The output destination designation circuits 351-1 to 351-N are provided in correspondence with the output destination switching circuits 352-1 to 352-N.

Each output destination switching circuit 352 (352-1 to 352-N) outputs, to the preset downstream frame processing circuit 36 designated by the corresponding output destination designation circuit 351 (351-1 to 351-N), the downstream control frame from the corresponding control frame processing circuit 34 (34-1 to 34-N). Each output destination designation circuit 351 (351-1 to 351-N) includes a memory M10 (M10$_1$ to M10$_N$), and the downstream frame processing circuit number of the output destination is written in the memory M10 (M10$_1$ to M10$_N$). This arrangement can output, to the same downstream frame processing circuit 36, all the downstream control frames 103 from the same control frame processing circuit 34.

Figure 20:
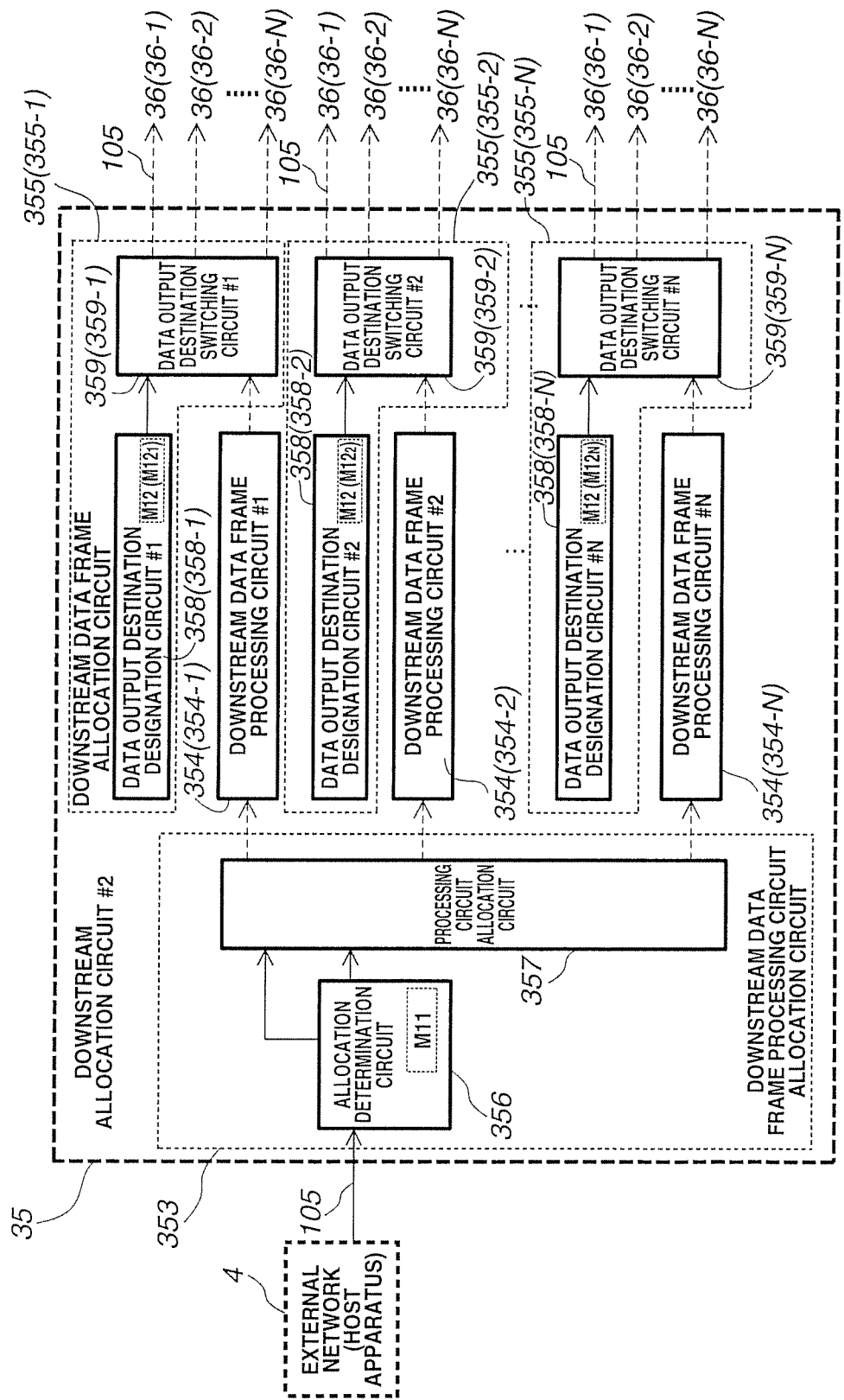
FIG. 20 is a block diagram showing examples of components related to the downstream data frame processing of downstream allocation circuit #2 in the OLT according to the fourth embodiment.

FIG. 20 shows examples of components related to the downstream data frame processing of the downstream allocation circuit 35. The downstream allocation circuit 35 includes a downstream data frame processing circuit allocation circuit 353, N downstream data frame processing circuits 354 (354-1 to 354-N) equal in number to the PON ports, and N downstream data frame allocation circuits 355 (355-1 to 355-N) in addition to the components shown in FIG. 19. The downstream data frame processing circuit allocation circuit 353 includes an allocation determination circuit 356 and a processing circuit allocation circuit 357, and each downstream data frame allocation circuit 355 (355-1 to 355-N) includes a data output destination designation circuit 358 (358-1 to 358-N) and a data output destination switching circuit 359 (359-1 to 359-N). The data output destination designation circuits 358-1 to 358-N are provided in correspondence with the data output destination switching circuits 359-1 to 359-N.

Upon receiving the downstream data frame 105 from the host apparatus 4 of the OLT 1D, the allocation determination circuit 356 extracts an identifier stored in the tag or the like of the downstream data frame 105, and designates, for the processing circuit allocation circuit 357, a downstream data frame processing circuit number corresponding to the value of the identifier as the allocation destination of the downstream data frame 105. The allocation determination circuit 356 includes a memory M11, and the downstream data frame processing circuit number of the allocation destination corresponding to the value of the extracted identifier is written in the memory M11.

Note that the identifier need only be information capable of identifying the ONU 3 or a user-side terminal connected to the ONU 3. In the Ethernet-PON system, the VLAN-ID of a VLAN tag added to the downstream data frame 105 or the destination MAC address of the downstream data frame 105 can be used as an identifier. If the host apparatus 4 of the OLT 1D stores an ID for identifying the ONU 3 in the preamble region or the like, the ID stored in the preamble region can be used. In another PON system as well, if an ID for identifying the ONU 3 is added to each downstream data frame 105, the ID can be used as the identifier.

The processing circuit allocation circuit 357 receives the designation of the allocation destination from the allocation determination circuit 356, and outputs, to the designated downstream data frame processing circuit 354, the downstream data frame 105 having undergone the allocation destination determination processing and sent from the allocation determination circuit 356. This arrangement can output the arbitrary downstream data frame 105 to the arbitrary downstream data frame processing circuit 354.

Each data output destination switching circuit 359 (359-1 to 359-N) outputs, to the preset downstream frame processing circuit 36 designated by the corresponding data output destination designation circuit 358 (358-1 to 358-N), the downstream data frame 105 from the corresponding downstream data frame processing circuit 354 (354-1 to 354-N). Each data output destination designation circuit 358 (358-1 to 358-N) includes a memory M12 ($M12_1$ to $M12_N$), and the downstream frame processing circuit number of the output destination is written in the M12 ($M12_1$ to $M12_N$). This arrangement can output, to the same downstream frame processing circuit 36, all the downstream data frames 105 from the same downstream data frame processing circuit 354.

Figure 21:
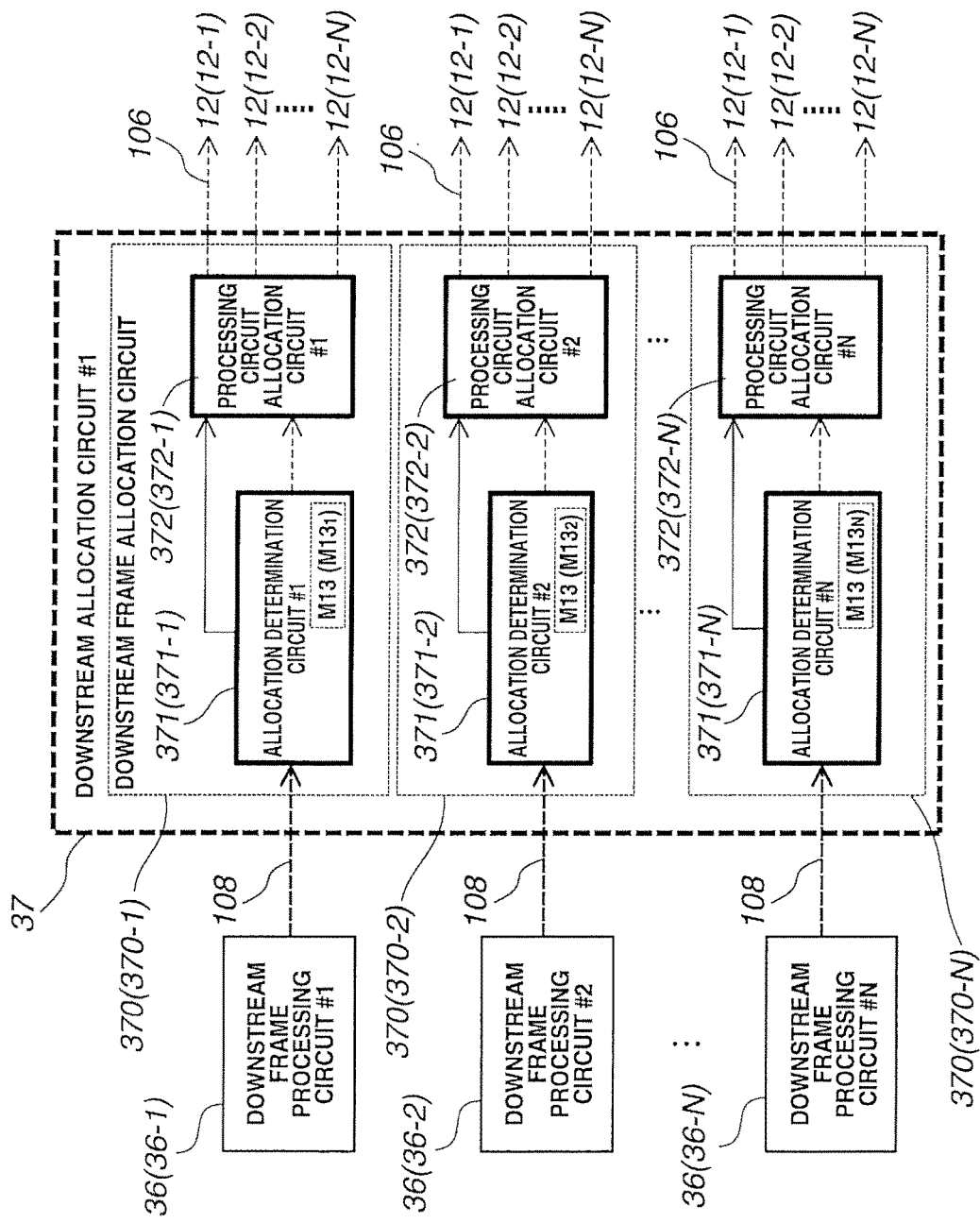
FIG. 21 is a block diagram showing examples of components related to the downstream frame processing of downstream allocation circuit #1 in the OLT according to the fourth embodiment.

FIG. 21 shows examples of components related to the downstream frame processing of the downstream allocation circuit 37. The downstream allocation circuit 37 includes N downstream frame allocation circuits 370 (370-1 to 370-N) equal in number to the PON ports. Each downstream frame allocation circuit 370 (370-1 to 370-N) includes an allocation determination circuit 371 (371-1 to 371-N) and a processing circuit allocation circuit 372 (372-1 to 372-N). The allocation determination circuits 371 (371-1 to 371-N) are provided in correspondence with the processing circuit allocation circuits 372 (372-1 to 372-N).

Upon receiving the downstream frame 108 via each downstream frame processing circuit 36 (361-1 to 361-N), the corresponding allocation determination circuit 371 (371-1 to 371-N) designates the preset frame reproduction circuit number as the allocation destination of the downstream frame 108 for the processing circuit allocation circuit 372 (372-1 to 372-N). Each allocation determination circuit 371 (371-1 to 371-N) includes a memory M13, and the frame reproduction circuit number of the allocation destination is written in the memory M13.

Upon receiving the designation of the allocation destination from each allocation determination circuit 371 (371-1 to 371-N), the corresponding processing circuit allocation circuit 372 (372-1 to 372-N) outputs, to the designated frame reproduction circuit 12, the downstream frame 108 having undergone the allocation destination determination processing and sent from the allocation determination circuit 371 (371-1 to 371-N). This arrangement can output, to the same frame reproduction circuit 12, all the downstream frames 108 from the same downstream frame processing circuit 36.

Note that an identifier stored in the tag, the preamble region, or the like of the downstream frame 108 may be extracted, and a frame reproduction circuit number corresponding to the value of the identifier may be designated as the allocation destination of the downstream frame 108 for the processing circuit allocation circuit 372 (372-1 to 372-N). In this case, the frame reproduction circuit number of the allocation destination corresponding to the value of the extracted identifier is written in the memory M13 of the allocation determination circuit 371 (371-1 to 371-N). This can output the arbitrary downstream frame 108 to the arbitrary frame reproduction circuit 12.

Figure 22:
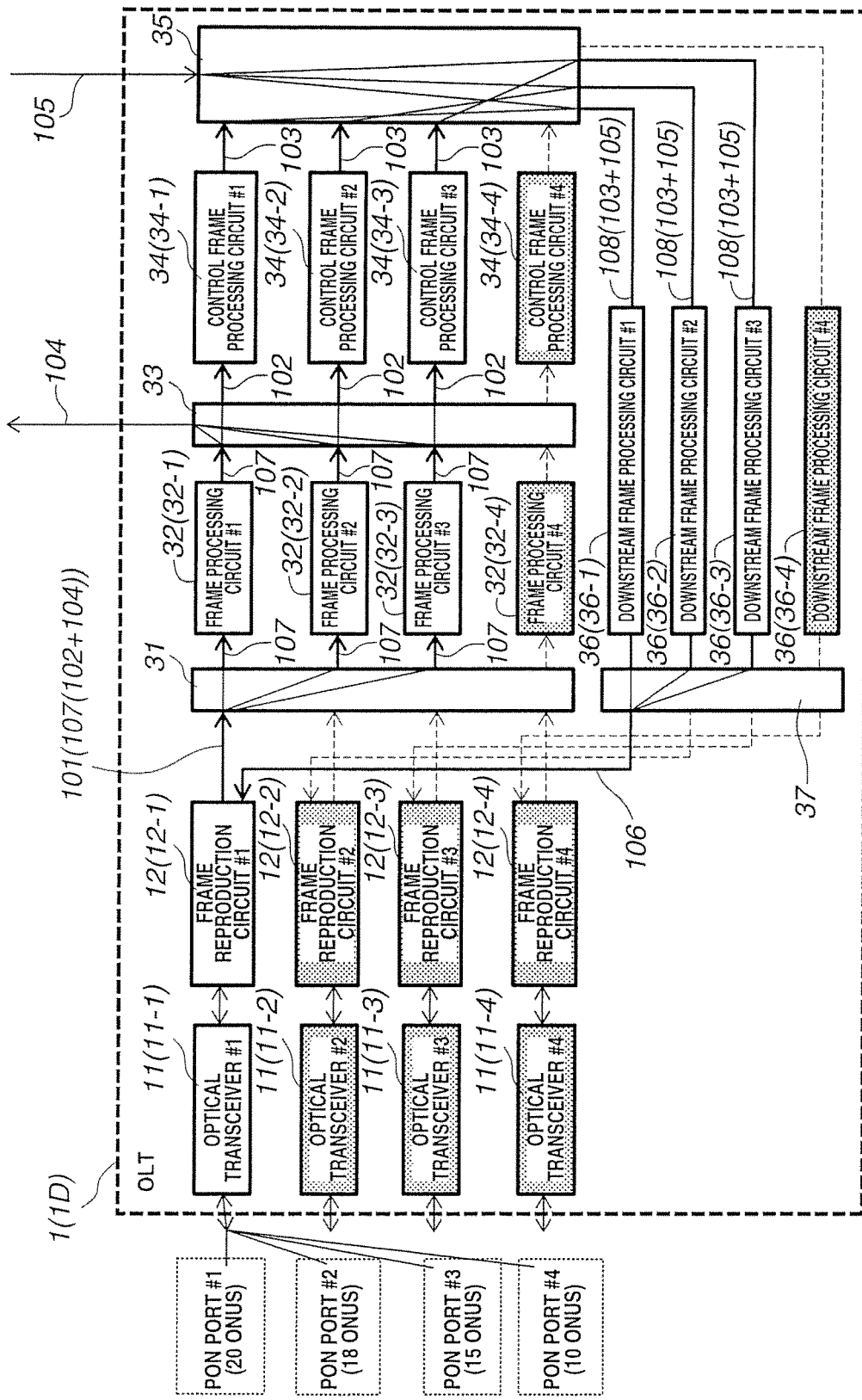
FIG. 22 is a block diagram for explaining an example of the operation of the OLT according to the fourth embodiment.

An example of the operation of the OLT 1D according to the fourth embodiment will be described next with reference to FIG. 22. As a practical example, assume a 4-PON port OLT in which the maximum number of accommodated ONUs for one PON port is 32. That is, the frame processing circuit 32, control frame processing circuit 34, and downstream frame processing circuit 36 have processing capability corresponding to the number of frames to be processed in the 32 ONUs 3 and the OLT 1D can accommodate 128 ONUs 3 at most.

PON ports #1 to #4 of the OLT 1D are connected to the 20 ONUs 3, 18 ONUs 3, 15 ONUs 3, and 10 ONUs 3, respectively. Upstream frames from the ONUs 3 connected to PON port #1 are added with "1 to 20" as LLIDs, upstream frames from the ONUs 3 connected to PON port #2 are added with "101 to 118" as LLIDs, upstream frames from the ONUs 3 connected to PON port #3 are added with "201 to 215" as LLIDs, and upstream frames from the ONUs 3 connected to PON port #4 are added with "301 to 310" as LLIDs.

Furthermore, assume that optical transmission processes with the ONUs 3 connected to the respective PON ports are all assigned to PON port #1 and operated, upstream frames 107 from all the ONUs 3 are bundled into the upstream superimposed frame 101 (upstream control frames 102+ upstream data frames 104) at the stage of optical signals, and input to the upstream allocation circuit 31 via the optical transceiver 11-1 and the frame reproduction circuit 12-1, and the downstream frames 108 (downstream control frames 103+downstream data frames 105) to all the ONUs 3 are bundled into the superimposed frame (downstream superimposed frame) 106 at the stage of electrical signals output from the downstream allocation circuit 37, and output to all the ONUs 3 via the frame reproduction circuit 12-1 and the optical transceiver 11-1. That is, in the OLT 1D, the number of optical transceivers 11 and the number of frame reproduction circuits 12 for reproducing the frame converted into the electrical signal by the optical transceiver 11 are one.

In the upstream allocation circuit 31 (see FIG. 16), upon receiving the superimposed frame 101 via the frame reproduction circuit 12-1, the allocation determination circuit 311-1 determines the LLID extracted from the preamble region of each upstream frame 107 bundled into the superimposed frame 101, and designates, for the processing circuit allocation circuit 312-1, a frame processing circuit number corresponding to the value of the LLID as the allocation destination of the upstream frame 107.

Assume that the frame processing circuit numbers of the allocation destinations corresponding to the LLIDs are written in the memory $M8_1$ of the allocation determination circuit 311-1 of the upstream allocation circuit 31 so as to output the upstream frames 107 having the LLIDs "1 to 20" to the frame processing circuit 32-1, output the upstream frames 107 having the LLIDs "101 to 118" to the frame processing circuit 32-2, and output the upstream frames 107 having the LLIDs "201 to 215" and "301 to 310" to the frame processing circuit 32-3.

In this case, the allocation determination circuit 311-1 allocates, to the frame processing circuit 32-1, the upstream frames 107 from the 20 ONUs 3 connected to PON port #1 before all the ONUs 3 are assigned to PON port #1. Similarly, the upstream frames 107 from the 18 ONUs 3 connected to PON port #2 before all the ONUs 3 are assigned to PON port #1 are allocated to the frame processing circuit 32-2. The upstream frames 107 from the 15 ONUs 3 connected to PON port #3 before all the ONUs 3 are assigned to PON port #1 and the 10 ONUs 3 connected to PON port #4 before all the ONUs 3 are assigned to PON port #1 are allocated to the frame processing circuit 32-3.

Consequently, the frame processing circuit 32-1 processes the upstream frames 107 corresponding to the 20 ONUs, the frame processing circuit 32-2 processes the upstream frames 107 corresponding to the 18 ONUs, and frame processing circuit 32-3 processes the upstream frames 107 corresponding to the 25 (=15+10) ONUs. The frame processing circuits 32-1 to 32-3 output the processed upstream frames 107 to the upstream allocation circuit 33.

In the upstream allocation circuit 33 (see FIG. 17), upon receiving the upstream frame 107 via the frame processing circuit 32-1, the allocation determination circuit 331-1 designates, for the processing circuit allocation circuit 332-1, a preset control frame processing circuit number as the allocation destination of the upstream control frame 102 included in the upstream frame 107.

In this example, the control frame processing circuit 34-1 is set as an allocation destination for the upstream control frame 102 input from the frame processing circuit 32-1, the control frame processing circuit 34-2 is set as an allocation destination for the upstream control frame 102 input from the frame processing circuit 32-2, and the control frame processing circuit 34-3 is set as an allocation destination for the upstream control frame 102 input from the frame processing circuit 32-3.

Note that similarly to the upstream allocation circuit 31, an LLID extracted from the preamble region of the upstream frame 107 may be determined, and a control frame processing circuit number corresponding to the value of the LLID may be designated as the allocation destination of the upstream control frame 102 included in the upstream frame 107 for the processing circuit allocation circuit 332.

Consequently, the control frame processing circuit 34-1 processes the upstream control frames 102 corresponding to the 20 ONUs, the control frame processing circuit 34-2 processes the upstream control frames 102 corresponding to the 18 ONUs, and the control frame processing circuit 34-3 processes the upstream control frames 102 corresponding to the 25 (=15+10) ONUs. The control frame processing circuits 34-1 to 34-3 output the processed downstream control frames 103 to the downstream allocation circuit 35.

In the downstream allocation circuit 35 (see FIG. 19), the downstream control frames 103 from the control frame processing circuits 34-1 to 34-3 are input to the output destination switching circuits 352-1 to 352-3, respectively. The output destination switching circuits 352-1 to 352-3 allocate the downstream control frames 103 from the control frame processing circuits 34-1 to 34-3 to the preset downstream frame processing circuits 36 designated by the output destination designation circuits 351-1 to 351-3, respectively.

In this example, the downstream frame processing circuit 36-1 is set as an allocation destination for the downstream control frame 103 input from the control frame processing circuit 34-1, the downstream frame processing circuit 36-2 is set as an allocation destination for the downstream control frame 103 input from the control frame processing circuit 34-2, and the downstream frame processing circuit 36-3 is set as an allocation destination for the downstream control frame 103 input from the control frame processing circuit 34-3.

Consequently, the downstream frame processing circuit 36-1 processes the downstream control frames 103 corresponding to the 20 ONUs, the downstream frame processing circuit 36-2 processes the downstream control frames 103 corresponding to the 18 ONUs, and the downstream frame processing circuit 36-3 processes the downstream control frames 103 corresponding to the 25 (=15+10) ONUs. The downstream frame processing circuits 36-1 to 36-3 output the processed downstream control frames 103 to the downstream allocation circuit 37.

Figure 23:
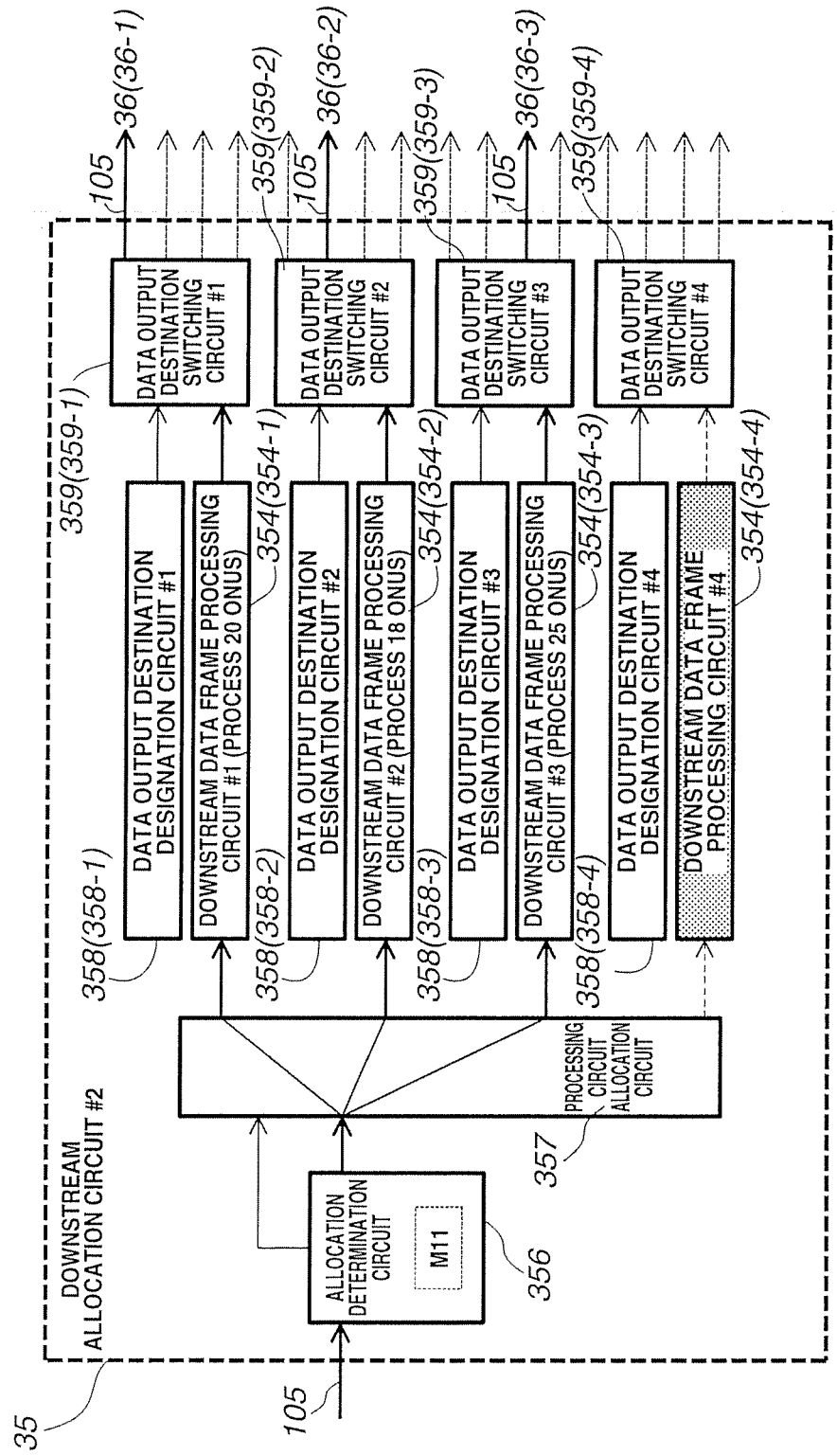
FIG. 23 is a block diagram for explaining an example of an operation related to the downstream data frame processing of downstream allocation circuit #2 in the OLT according to the fourth embodiment.

An operation related to the downstream data frame processing of the downstream allocation circuit 35 will be described with reference to FIG. 23. In accordance with the criterion that the maximum number of accommodated ONUs for one PON port is 32, each downstream data frame processing circuit 354 has processing capability corresponding to the number of frames to be processed in the 32 ONUs, similarly to the control frame processing circuit 34. As for the downstream data frames 105 output from the host apparatus 4 to the OLT 1D, the downstream data frames 105 to the ONUs 3 connected to PON port #1 are added with VLAN tags having VLAN-IDs "1 to 20", the downstream data frames 105 to the ONUs 3 connected to PON port #2 are added with VLAN tags having VLAN-IDs "101 to 118", the downstream data frames 105 to the ONUs 3 connected to PON port #3 are added with VLAN tags having VLAN-IDs "201 to 215", and the downstream data frames 105 to the ONUs 3 connected to PON port #4 are added with VLAN tags having VLAN-IDs "301 to 310".

In the downstream allocation circuit 35, upon receiving the downstream data frame 105 from the host apparatus 4 of the OLT 1D, the allocation determination circuit 356 determines the VLAN-ID extracted from the VLAN tag of the downstream data frame 105, and designates, for the processing circuit allocation circuit 357, a downstream data frame processing circuit number corresponding to the value of the VLAN-ID as the allocation destination of the downstream data frame 105.

Assume that the downstream data frame processing circuit numbers of the allocation destinations corresponding to the VLAN-IDs are written in the memory M11 of the allocation determination circuit 356 of the downstream allocation circuit 35 so as to output the downstream data frames 105 having the VLAN-IDs "1 to 20" to the downstream data frame processing circuit 354-1, output the downstream data frames 105 having the VLAN-IDs "101 to 118" to the downstream data frame processing circuit 354-2, and output the downstream data frames 105 having the VLAN-IDs "201 to 215" and "301 to 310" to the downstream data frame processing circuit 354-3.

In this case, the allocation determination circuit 356 allocates, to the downstream data frame processing circuit 354-1, the downstream data frames 105 to the 20 ONUs 3 connected to PON port #1 before all the ONUs 3 are assigned to PON port #1. Similarly, the downstream data frames 105 to the 18 ONUs 3 connected to PON port #2 before all the ONUs 3 are assigned to PON port #1 are allocated to the downstream data frame processing circuit 354-2. The downstream data frames 105 to the 15 ONUs 3 connected to PON port #3 before all the ONUs 3 are assigned to PON port #1 and the 10 ONUs 3 connected to PON port #4 before all the ONUs 3 are assigned to PON port #1 are allocated to the downstream data frame processing circuit 354-3.

Consequently, the downstream data frame processing circuit 354-1 processes the downstream data frames 105 corresponding to the 20 ONUs, the downstream data frame processing circuit 354-2 processes the downstream data frames 105 corresponding to the 18 ONUs, and the downstream data frame processing circuit 354-3 processes the downstream data frames 105 corresponding to the 25 (=15+10) ONUs. The processed downstream data frames 105 are output to the data output destination switching circuits 359-1 to 359-3.

The data output destination switching circuits 359-1 to 359-3 allocate, to the preset downstream frame processing circuits 36 designated by the data output destination designation circuits 358-1 to 358-3, the downstream data frames 105 from the downstream data frame processing circuits 354-1 to 354-3, respectively.

In this example, the downstream frame processing circuit 36-1 is set as an allocation destination for the downstream data frame 105 input from the downstream data frame processing circuit 354-1, the downstream frame processing circuit 36-2 is set as an allocation destination for the downstream data frame 105 input from the downstream data frame processing circuit 354-2, and the downstream frame processing circuit 36-3 is set as an allocation destination for the downstream data frame 105 input from the downstream data frame processing circuit 354-3.

Consequently, the downstream frame processing circuit 36-1 processes the downstream data frames 105 corresponding to the 20 ONUs, the downstream frame processing circuit 36-2 processes the downstream data frames 105 corresponding to the 18 ONUs, and the downstream frame processing circuit 36-3 processes the downstream data frames 105 corresponding to the 25 (=15+10) ONUs. The downstream frame processing circuits 36-1 to 36-3 output the processed downstream data frames 105 to the downstream allocation circuit 37.

In the downstream allocation circuit 37 (see FIG. 21), the downstream frames 108 (downstream control frames 103+ downstream data frames 105) from the downstream frame processing circuits 36-1 to 36-3 are input to the allocation determination circuits 371-1 to 371-3, respectively. The processing circuit allocation circuits 372-1 to 372-3 allocate, to the preset frame reproduction circuits 12 designated by the allocation determination circuits 371-1 to 371-3, the downstream frames 108 from the downstream frame processing circuits 36-1 to 36-3, respectively.

In this example, the frame reproduction circuit 12-1 serving as the output source of the upstream superimposed frame 101 is set as the frame reproduction circuit 12 of the output destination in all the allocation determination circuits 371 (371-1 to 371-N). Thus, the downstream frames 108 input to the downstream allocation circuit 37 are bundled into the downstream superimposed frame 106 at the stage of the electric signals output from the downstream allocation circuit 37, and sent to the frame reproduction circuit 12-1.

In the OLT 1D, although the number of accommodated ONUs for one PON port is 32 and the maximum number of accommodated ONUs of the whole OLT is 128, the 63 ONUS 3 are accommodated in total. However, the operation by assigning the ONUs to PON port #1 increases the number of accommodated ONUs for one PON port to 63. This can power off unused circuits in advance.

That is, in this operation example, circuits used in the OLT 1D are the optical transceiver 11-1, the frame reproduction circuit 12-1, the frame processing circuits 32-1 to 32-3, the control frame processing circuits 34-1 to 34-3, the downstream frame processing circuits 36-1 to 36-3, the upstream allocation circuit 31, the upstream allocation circuit 33, the downstream allocation circuit 35, and the downstream allocation circuit 37. The remaining circuits (the optical transceivers 11-2 to 11-4, the frame reproduction circuits 12-2 to 12-4, the frame processing circuit 32-4, the control frame processing circuit 34-4, and the downstream frame processing circuit 36-4) can be powered off.

Furthermore, the use efficiency of the control frame processing circuit 34-3 is improved by allocation, to the control frame processing circuit 34-3, the upstream control frames 102 from the 15 ONUs 3 connected to PON port #3 and the 10 ONUs 3 connected to PON port #4 to process them. Along with the improvement of the use efficiency of the control frame processing circuit 34-3, there exists the control frame processing circuit 34-4 as a control frame processing circuit unnecessary to be used. By powering off the control frame processing circuit 34-4 in advance, it is possible to eliminate the waste of power.

The use efficiency of the frame processing circuit 32-3 is improved by allocation, to the frame processing circuit 32-3, the upstream frames 107 (upstream control frames 102+ upstream data frames 104) from the 15 ONUs 3 connected to PON port #3 and the 10 ONUs 3 connected to PON port #4 to process them. Along with the improvement of the use efficiency of the frame processing circuit 32-3, there exists the frame processing circuit 32-4 as the frame processing circuit 32 unnecessary to be used. By powering off the frame processing circuit 32-4 in advance, it is possible to eliminate the waste of power.

The use efficiency of the downstream data frame processing circuit 354-3 is improved by allocation, to the downstream data frame processing circuit 354-3, the downstream data frames 105 from the 15 ONUs 3 connected to PON port #3 and the 10 ONUs 3 connected to PON port #4 to process them. Along with the improvement of the use efficiency of the downstream data frame processing circuit 354-3, there exists the downstream data frame processing circuit 354-4 as a downstream data frame processing circuit unnecessary to be used. By powering off the downstream data frame processing circuit 354-4 in advance, it is possible to eliminate the waste of power.

The use efficiency of the downstream frame processing circuit 36-3 is improved by allocation, to the downstream frame processing circuit 36-3, the downstream frames to the 15 ONUs 3 connected to PON port #3 and the 10 ONUs 3 connected to PON port #4 to process them. Along with the improvement of the use efficiency of the downstream frame processing circuit 36-3, there exists the downstream frame processing circuit 36-4 as a downstream frame processing circuit unnecessary to be used. By powering off the downstream frame processing circuit 36-4 in advance, it is possible to eliminate the waste of power.

Note that in the above-described operation example, the system form in which the operation is performed by assigning the ONUs to one PON port (PON port #1) has been explained. The present invention, however, is not limited to this. For example, the ONUs may be assigned to two PON ports. If the ONUs are assigned to two PON ports, two upstream superimposed frames 101 obtained by dividing and bundling the upstream frames from all the ONUs 3 into two groups are input to the upstream allocation circuit 31 via the two frame reproduction circuits 12, and each upstream frame 107 bundled into the two upstream superimposed frames 101 is allocated to the predetermined frame processing circuit 32 based on information (LLID or the like) added to the frames. A system designer can arbitrarily decide specific PON ports to which the ONUs are assigned and a specific PON port corresponding to the frame reproduction circuit 12 to which each downstream superimposed frame 106 is to be output.

The above operation example has been explained using the practical numerical values. The numerical values in the operation example are merely examples, and other values can be used, as a matter of course.

Extension of Embodiments

The present invention has been described above with reference to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

INDUSTRIAL APPLICABILITY

The present invention can be used as a station-side apparatus in an optical transmission system that transfers frames between a host apparatus and a plurality of subscriber-side apparatuses connected via an optical transmission channel.

EXPLANATION OF THE REFERENCE NUMERALS AND SIGNS 1 (1A to 1D) . . . OLT, 2 . . . optical splitter, 3 . . . ONU, 4 . . . external network (host apparatus), 5, 6 . . . optical fiber, 11 . . . optical transceiver, 12 . . . frame reproduction circuit, 13 . . . PON control circuit, 14 (14A, 14B) . . . upstream allocation circuit, 15 (15A, 15B) . . . downstream allocation circuit, 21 . . . upstream allocation circuit, 22 . . . downstream allocation circuit, 23 . . . control frame processing circuit, 31 . . . upstream allocation circuit (second upstream allocation circuit), 32 . . . frame processing circuit, 33 . . . upstream allocation circuit (first upstream allocation circuit), 34 . . . control frame processing circuit, 35 . . . downstream allocation circuit (second downstream allocation circuit), 36 . . . downstream frame processing circuit, 37 . . . downstream allocation circuit (first downstream allocation circuit), 131 . . . control frame processing circuit, 210 . . . upstream control frame allocation circuit, 220 . . . downstream control frame allocation circuit, 223 . . . downstream data frame processing circuit allocation circuit, 224 . . . downstream data frame processing circuit, 225 . . . downstream data frame allocation circuit, 310 . . . upstream control frame allocation circuit, 333 . . . upstream data frame processing circuit, 350 . . . downstream control frame allocation circuit, 353 . . . downstream data frame processing circuit allocation circuit, 354 . . . downstream data frame processing circuit, 355 . . . downstream data frame allocation circuit, 370 . . . downstream frame allocation circuit, 100 . . . optical transmission system

The invention claimed is:

1. A station-side apparatus in an optical transmission system, comprising:
a plurality of optical transceivers each configured to convert, into electrical signals, upstream frames including upstream control frames sent as optical signals from a plurality of subscriber-side apparatuses connected via an optical transmission channel;
a plurality of frame reproduction circuits each configured to reproduce the upstream frames converted into the electrical signals by the plurality of optical transceivers;
a plurality of control frame processing circuits each configured to perform predetermined processes for the upstream control frames included in the upstream frames reproduced by the plurality of frame reproduction circuits, wherein the predetermined processes comprise establishing and managing a link with each of the plurality of subscriber-side apparatuses, and Dynamic Bandwidth Allocation processing for controlling the transmission timings of the upstream frames;
a first upstream allocation circuit configured to allocate each of the upstream control frames included in the upstream frames from the plurality of subscriber-side apparatuses to a predetermined one of the plurality of control frame processing circuits based on information added to the frames, wherein the information added to the frames comprises an identifier for identifying each of the plurality of subscriber-side apparatuses; and
a first downstream allocation circuit configured to allocate, to a predetermined one of the plurality of frame reproduction circuits, each of downstream control frames output from the control frame processing circuits to which the upstream control frames have been allocated.

2. The station-side apparatus in the optical transmission system according to claim 1, wherein the first upstream allocation circuit includes an upstream control frame allocation circuit configured to allocate each of the upstream control frames included in the upstream frames from the plurality of subscriber-side apparatuses to a predetermined one of the plurality of control frame processing circuits based on a communication port number added to the frames.

3. The station-side apparatus in the optical transmission system according to claim 1, wherein the first upstream allocation circuit includes an upstream control frame allocation circuit configured to allocate each of the upstream control frames included in the upstream frames from the plurality of subscriber-side apparatuses to a predetermined one of the plurality of control frame processing circuits based on a subscriber-side apparatus identifier added to the frames.

4. The station-side apparatus in the optical transmission system according to claim 1, wherein the first downstream allocation circuit includes a downstream control frame allocation circuit configured to allocate, to the preset frame reproduction circuit, each of the downstream control frames output from the control frame processing circuits to which the upstream control frames have been allocated.

5. The station-side apparatus in the optical transmission system according to claim 1, wherein the first downstream allocation circuit includes a downstream control frame allocation circuit configured to allocate, to a predetermined one of the plurality of frame reproduction circuits, each of the downstream control frames output from the control frame processing circuits to which the upstream control frames have been allocated, based on a communication port number added to the frames.

6. The station-side apparatus in the optical transmission system according to claim 1, wherein the first downstream allocation circuit includes a downstream control frame allocation circuit configured to allocate, to a predetermined one of the plurality of frame reproduction circuits, each of the downstream control frames output from the control frame processing circuits to which the upstream control frames have been allocated, based on a subscriber-side apparatus identifier added to the frames.

7. The station-side apparatus in the optical transmission system according to claim 1, wherein the first upstream allocation circuit includes an upstream control frame allocation circuit configured to receive, via one of the plurality of frame reproduction circuits, a superimposed frame obtained by bundling the plurality of upstream frames from the plurality of subscriber-side apparatuses, and allocate each of the upstream control frames included in the upstream frames bundled into the superimposed frame to a predetermined one of the plurality of control frame processing circuits based on information added to the respective upstream frames.

8. The station-side apparatus in the optical transmission system according to claim 1, wherein the first upstream allocation circuit includes an upstream control frame allocation circuit configured to receive, via a plurality of frame reproduction circuits of the plurality of frame reproduction circuits, a plurality of superimposed frames obtained by dividing and bundling the plurality of upstream frames from the plurality of subscriber-side apparatuses into a plurality of groups, and allocate each of the upstream control frames included in the upstream frames bundled into the plurality of superimposed frames to a predetermined one of the plurality of control frame processing circuits based on information added to the respective frames.

9. The station-side apparatus in the optical transmission system according to claim 1, wherein the first downstream allocation circuit includes
   a plurality of downstream data frame processing circuits each configured to perform predetermined processing for a downstream data frame sent from a host apparatus;
   a downstream data frame processing circuit allocation circuit configured to allocate, to a predetermined one of the plurality of downstream data frame processing circuits, each of the downstream data frames sent from the host apparatus, based on information added to the frames, and
   a downstream data frame allocation circuit configured to allocate, to the preset frame reproduction circuit, each of downstream data frames output from the downstream data frame processing circuits to which the downstream data frames have been allocated.

10. The station-side apparatus in the optical transmission system according to claim 1, further comprising:
   a plurality of frame processing circuits each configured to perform predetermined processes for the upstream frames reproduced by the plurality of frame reproduction circuits; and
   a second upstream allocation circuit configured to allocate, to a predetermined one of the plurality of frame processing circuits, each of the upstream frames from the plurality of subscriber-side apparatuses, based on information added to the frames,
   wherein the first upstream allocation circuit includes an upstream control frame allocation circuit configured to allocate, to a predetermined one of the plurality of control frame processing circuits, each of upstream control frames included in the upstream frames output from the frame processing circuits to which the upstream frames have been allocated, based on information added to the frames.

11. The station-side apparatus in the optical transmission system according to claim 10, further comprising:
   a plurality of downstream frame processing circuits each configured to perform predetermined processes for downstream control frames output from the plurality of control frame processing circuits; and
   a second downstream allocation circuit configured to allocate, to a predetermined one of the plurality of downstream frame processing circuits, each of downstream control frames output from the control frame processing circuits to which the upstream control frames have been allocated.

12. The station-side apparatus in the optical transmission system according to claim 11, wherein the second downstream allocation circuit includes
   a plurality of downstream data frame processing circuits each configured to perform predetermined processing for a downstream data frame sent from a host apparatus,
   a downstream data frame processing circuit allocation circuit configured to allocate, to a predetermined one of the plurality of downstream data frame processing circuits, each of the downstream data frames sent from the host apparatus, based on information added to the frames, and
   a downstream data frame allocation circuit configured to allocate, to the preset downstream frame processing circuits, each of downstream data frames output from the downstream data frame processing circuits to which the downstream data frames have been allocated.

13. An optical transmission system comprising:
a station-side apparatus;
an external network configured to receive upstream frames from the station-side apparatuses;
a plurality of subscriber-side apparatuses; and
an optical transmission channel comprising an optical splitter that is connected to the station-side apparatus via a first optical fiber and is connected to each of the plurality of subscriber-side apparatuses via one of a plurality of second optical fibers,
wherein the station-side apparatus comprises:
   a plurality of optical transceivers each configured to convert, into electrical signals, upstream frames including upstream control frames sent as optical signals from the plurality of subscriber-side apparatuses via the optical transmission channel,
   a plurality of frame reproduction circuits each configured to reproduce the upstream frames converted into the electrical signals by the plurality of optical transceivers,
   a plurality of control frame processing circuits each configured to perform predetermined processes for the upstream control frames included in the upstream frames reproduced by the plurality of frame reproduction circuits, wherein the predetermined processes comprise establishing and managing a link with each of the plurality of subscriber-side apparatuses, and Dynamic Bandwidth Allocation processing for controlling the transmission timings of the upstream frames,
   a first upstream allocation circuit configured to allocate each of the upstream control frames included in the upstream frames from the plurality of subscriber-side apparatuses to a predetermined one of the plurality of control frame processing circuits based on, information added to the frames, wherein the information added to the frames comprises an identifier for identifying each of the plurality of subscriber-side apparatuses, and
   a first downstream allocation circuit configured to allocate, to a predetermined one of the plurality of frame reproduction circuits, each of downstream control frames output from the control frame processing circuits to which the upstream control frames have been allocated,
wherein the optical splitter is configured to receive upstream data frames transmitted from at least one of the subscriber-side apparatuses as optical signals via the one of the plurality of second optical fibers and transmit the optical signals to a corresponding optical transceiver of the station-side apparatus via the first optical fiber.

* * * * *